US011430025B2

(12) United States Patent
Lkhamsuren

(10) Patent No.: US 11,430,025 B2
(45) Date of Patent: Aug. 30, 2022

(54) SYNTHETIC DATA GENERATION MODELING SYSTEM

(71) Applicant: Airbnb, Inc., San Francisco, CA (US)

(72) Inventor: Luvsandondov Lkhamsuren, San Francisco, CA (US)

(73) Assignee: Airbnb, Inc., San Francisco, CA (US)

( * ) Notice: Subject to any disclaimer, the term of this patent is extended or adjusted under 35 U.S.C. 154(b) by 986 days.

(21) Appl. No.: 16/165,302

(22) Filed: Oct. 19, 2018

(65) Prior Publication Data

US 2020/0126129 A1 Apr. 23, 2020

(51) Int. Cl.
*G06Q 30/02* (2012.01)
*G06Q 10/02* (2012.01)
*G06N 20/00* (2019.01)
*G06Q 30/06* (2012.01)

(52) U.S. Cl.
CPC ......... *G06Q 30/0283* (2013.01); *G06N 20/00* (2019.01); *G06Q 10/02* (2013.01); *G06Q 30/0641* (2013.01)

(58) Field of Classification Search
CPC .......................... G06Q 10/02; G06Q 30/0283
See application file for complete search history.

(56) References Cited

U.S. PATENT DOCUMENTS

| 5,377,095 | A | 12/1994 | Maeda et al. |
| 9,727,616 | B2 | 8/2017 | Wu et al. |
| 2007/0055554 | A1* | 3/2007 | Sussman ............... G06Q 10/06 705/5 |
| 2009/0326998 | A1 | 12/2009 | Watkins et al. |
| 2016/0055505 | A1* | 2/2016 | Rana ................... G06Q 30/0206 705/5 |
| 2016/0148237 | A1* | 5/2016 | Ifrach .................... G06Q 10/02 705/7.31 |

OTHER PUBLICATIONS

Ye et al., "Customized Regression Model for Airbnb Dynamic Pricing", KDD 2018, Aug. 19-23, 2018, London, United Kingdom (Year: 2018).*
"International Application Serial No. PCT US2019 056500, International Preliminary Report on Patentability dated Apr. 29, 2021", 6 pgs.
"International Application Serial No. PCT US2019 056500, International Search Report dated Jan. 30, 2020", 2 pgs.
"International Application Serial No. PCT US2019 056500, Written Opinion dated Jan. 30, 2020", 4 pgs.

* cited by examiner

*Primary Examiner* — Emmett K. Walsh
(74) *Attorney, Agent, or Firm* — Schwegman Lundberg & Woessner, P.A.

(57) ABSTRACT

Systems and methods are provided for generating a first trained machine learning model, the first machine learning model comprising a plurality of hard layers for learning correlations between listing features and a plurality of soft layers, each soft layer for learning correlations for a prespecified listing feature. The systems and methods further provide for analyzing, using the first trained machine learning model, each of a plurality of price changes and price independent listing features for the first listing to determine a predicted value for each of a prespecified price dependent listing feature for each of the plurality of price changes for the first listing and generating, using the first trained machine learning model, the predicted value for each of the prespecified price dependent listing features for each of the plurality of price changes for the first listing.

20 Claims, 14 Drawing Sheets

SYNTHETIC DATA GENERATION MODELING SYSTEM

BACKGROUND

An online marketplace may provide a number of services (e.g., accommodations, tours, transportation) and allow users to reserve or "book" one or more services. For example, a first user (e.g., host) can list one or more services in the online market place and a second user (e.g., guest) can request to view listings of services for a particular location (e.g., San Francisco) that may include a listing for the first user's service. There are a number of listing features, such as price, price discounts, how often the service is booked or occupied, a demand for the service, a type of listing, and so forth, for any given listing. Changing a price for a listing may result in changes to one or more of the listing features.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
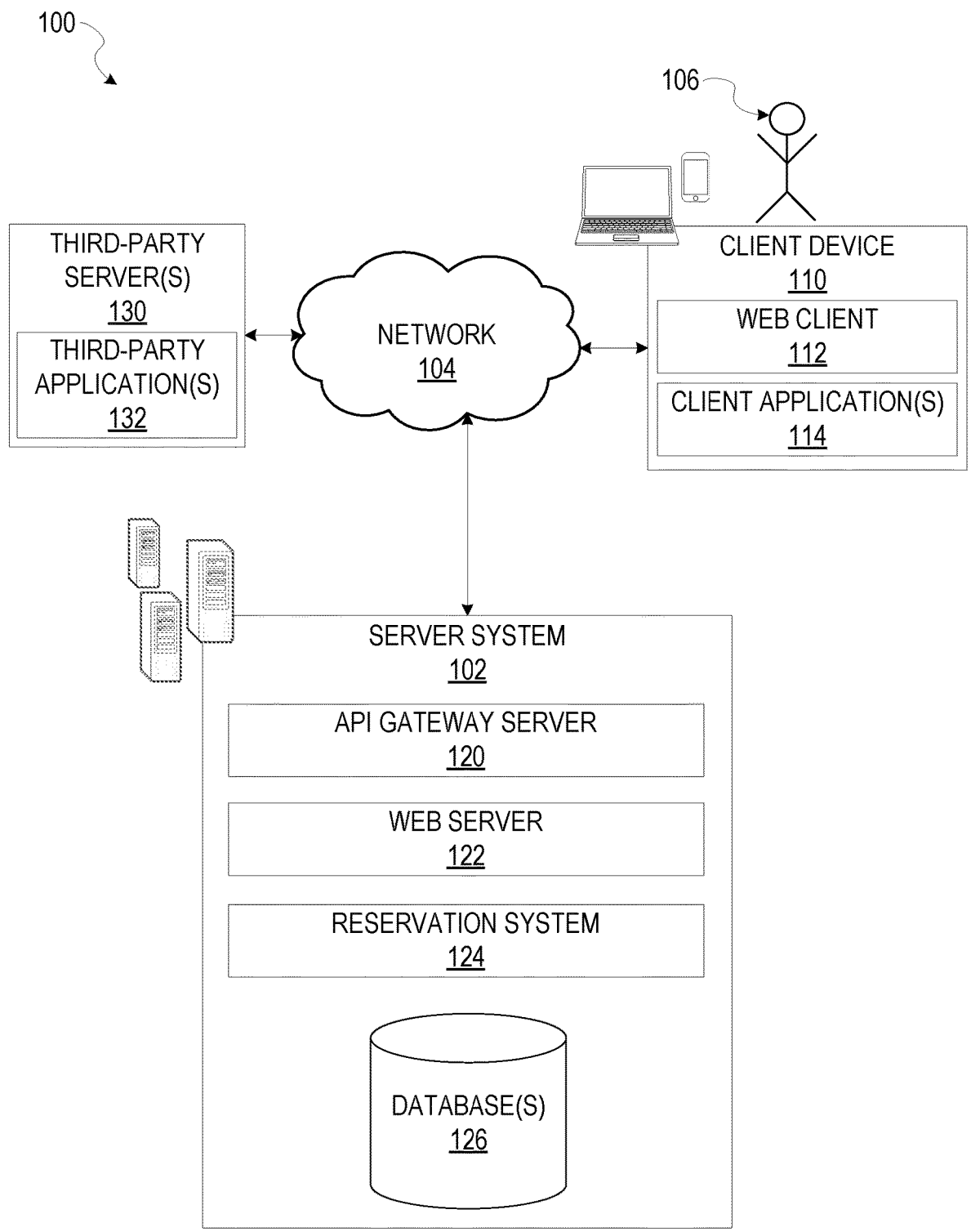
FIG. 1 is a block diagram illustrating a networked system, according to some example embodiments.

Systems and methods described herein relate to a synthetic data generation modeling system. For example, an online marketplace may provide various listings for services, such as trip items. Services or trip items may comprise accommodations hosted by various managers that can be reserved by clients, such as an apartment, a house, a cabin, a camper, one or more rooms in an apartment or house, and the like. For example, one manager or owner of a home may list one or more rooms in his own home on the online marketplace, a second manager of a home may list an entire home on the online marketplace, a third manager may list an entire cabin on the online marketplace, and so forth. In one example, the listings may be time-expiring inventory. With time-expiring inventory (e.g., time-expiring accommoda-tions), if the inventory is not booked and used before it expires, the inventory is wasted, and the manager receives no revenue. The online marketplace may further provide listings for other services or trip items, such as experiences (e.g., local tours), car rental, flights, public transportation, and other transportation or activities related to travel. "Supplier," "manager," "host," and "owner" are used interchangeably herein to mean a user or entity that hosts a particular service (e.g., accommodation, tour, transportation option, etc.). "Client" or "guest" are used interchangeably herein to mean a user that is interested in and/or reserves a particular service.

Each listing in the online marketplace has a number of features associated with the listing. Some example features include a price for the listing, one or more fees (e.g., cleaning fee, additional guest fee, etc.), a listing view (e.g., number of views by users), a price discount (e.g., weekly or monthly price discount), a number of beds, a number of bedrooms, a percentage of time the listing is occupied or booked, and so forth. To predict an accurate booking probability for a given listing for a given date (e.g., night for an accommodation), it may be useful to incorporate as many features as possible to capture all the signals available to accurately predict the booking probability. Moreover, some of the most pertinent features have a high correlation with listing price (e.g., listing views, trailing or forward occupancy, discounts, etc.). One technical problem is that the complexity of so many features or factors becomes far beyond human capability to calculate. For example, it is not possible to determine the dependency of each factor or feature on each of the other factors of features. A simple model could be built to assume that features stay constant when price is changed, however, this method results in stale booking probability output. Furthermore, if there are a lot of listings in the online marketplace that use a flat pricing strategy, this will result in a feedback loop in the system during training of a model where there is not enough price variation.

In order to overcome these technical limitations, example embodiments use machine learning methodology to predict price dependent features from price and price independent features. Among other things, this methodology allows example embodiments to generate data for a more accurate demand curve and to generate synthetic training data for a booking probability model. For example, a computing system generates training data for a first machine learning model to predict how a change in listing price effects a plurality of listing features by analyzing data generated in an online market place to determine a plurality of listings that have only a single price change in a predetermined time period, generating listing features for each of the plurality of listings that have only a single price change in the predetermined time period, and storing as training data the generated listing features for each of the plurality of listings that have only a single price change in the predetermined time period. The generated training data is input into the first machine learning model to generate a first trained machine learning model. In one example, the first machine learning model comprises a plurality of hard layers for learning correlations between listing features and a plurality of soft layers, with each soft layer for learning correlations for a prespecified listing feature. The computing system receives one or more changes for a first listing and analyzes, using the first trained machine learning model, each of the one or more price changes and price independent listing features for the first listing to determine a predicted value for each of a prespecified price dependent listing feature for each of the one or more price changes for the first listing. The computing system generates, using the first trained machine learning model, the predicted value for each of the prespecified price dependent listing features for each of the one or more price changes for the first listing. The computing system can then use the generated predicted value for each of the prespecified price dependent listing features for each of the one or more price changes for the first listing to train a second machine learning model to generate a second trained machine learning model to predict a probability that a listing will be booked for a given date.

FIG. 1 is a block diagram illustrating a networked system 100, according to some example embodiments. The system 100 may include one or more client devices such as a client device 110. The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, computer in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, Global Positioning System (GPS) devices, and so forth. The client device 110 may be a device of a user that is used to request and receive reservation information, accommodation information, and so forth, associated with travel. The client device 110 may also be a device of a user that is used to post and maintain a listing for a service, request and receive reservation information, guest information, and so forth.

One or more users 106 may be a person, a machine, or other means of interacting with the client device 110. In example embodiments, the user 106 may not be part of the system 100 but may interact with the system 100 via the client device 110 or other means. For instance, the user 106 may provide input (e.g., voice input, touch screen input, alphanumeric input, etc.) to the client device 110 and the input may be communicated to other entities in the system 100 (e.g., third-party servers 130, a server system 102, etc.) via a network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WI-FI network, a WiMax network, another type of network, or a combination of two or more such networks.

The client device 110 may access the various data and applications provided by other entities in the system 100 via a web client 112 (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, a messaging application, an electronic mail (email) application, an e-commerce site application, a mapping or location application, a reservation application, and the like.

In some embodiments, one or more client applications 114 may be included in a given one of the client devices 110 and configured to locally provide the user interface and at least some of the functionalities, with the client application 114 configured to communicate with other entities in the system 100 (e.g., third-party servers 130, the server system 102, etc.), on an as-needed basis, for data and/or processing capabilities not locally available (e.g., to access reservation or listing information, to request data, to authenticate a user 106, to verify a method of payment, etc.). Conversely, one or more client applications 114 may not be included in the client device 110, and then the client device 110 may use its web browser to access the one or more applications hosted on other entities in the system 100 (e.g., third-party servers 130, the server system 102, etc.).

The system 100 may further include one or more third-party servers 130. The one or more third-party servers 130 may include one or more third-party application(s) 132. The one or more third-party application(s) 132, executing on the third-party server(s) 130, may interact with the server system 102 via a programmatic interface provided by an application programming interface (API) gateway server 120. For example, one or more of the third-party applications 132 may request and utilize information from the server system 102 via the API gateway server 120 to support one or more features or functions on a website hosted by a third party or an application hosted by the third party. The third-party website or application 132, for example, may provide various functionality that is supported by relevant functionality and data in the server system 102.

The server system 102 may provide server-side functionality via the network 104 (e.g., the Internet or a wide area network (WAN)) to one or more third-party servers 130 and/or one or more client devices 110. The server system 102 may be a cloud computing environment, according to some example embodiments. The server system 102, and any servers associated with the server system 102, may be associated with a cloud-based application, in one example embodiment.

In one example, the server system 102 provides server-side functionality for an online marketplace. The online marketplace may provide various listings for trip items, such as accommodations hosted by various managers (also referred to as "owners" or "hosts") that can be reserved by clients (also referred to as "users" or "guests"), such as an apartment, a house, a cabin, one or more rooms in an apartment or house, and the like. As explained above, the online marketplace may further provide listings for other trip items, such as experiences (e.g., local tours), car rental, flights, public transportation, and other transportation or activities related to travel.

The server system 102 may include the API gateway server 120, a web server 122, and a reservation system 124, that may be communicatively coupled with one or more databases 126 or other forms of data store.

The one or more databases 126 may be one or more storage devices that store data related to the reservation system 124 and other systems or data. The one or more databases 126 may further store information related to third-party servers 130, third-party applications 132, client devices 110, client applications 114, users 106, and so forth. The one or more databases 126 may be implemented using any suitable database management system such as MySQL, PostgreSQL, Microsoft SQL Server, Oracle, SAP, IBM DB2, or the like. The one or more databases 126 may include cloud-based storage, in some embodiments.

The reservation system 124 may manage resources and provide back-end support for third-party servers 130, third-party applications 132, client applications 114, and so forth, which may include cloud-based applications. The reservation system 124 may provide functionality for viewing listings related to trip items (e.g., accommodation listings, activity listings, etc.), managing listings, booking listings and other reservation functionality, and so forth, for an online marketplace. Further details related to the reservation system 124 are shown in FIG. 2.

Figure 2:
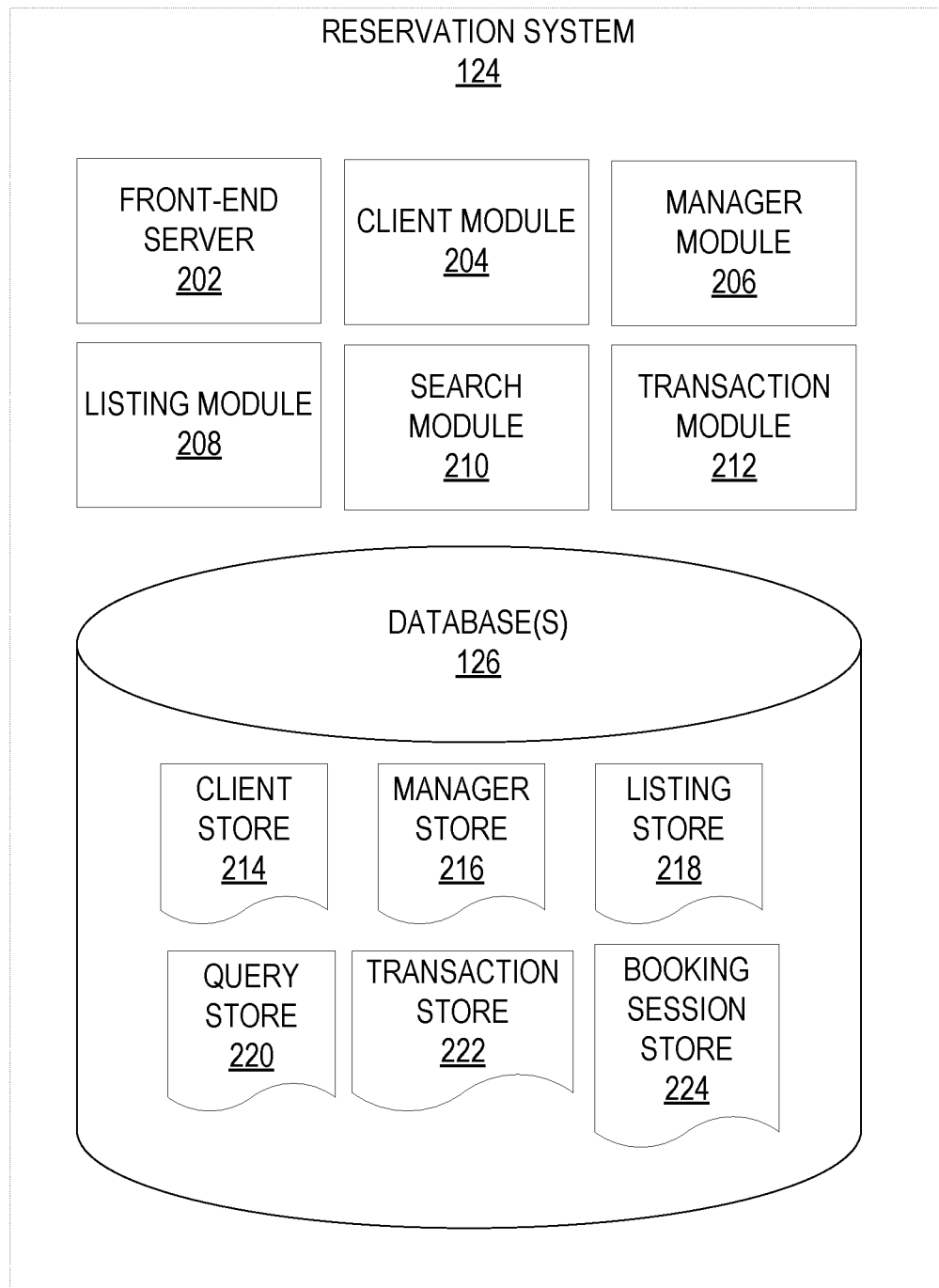
FIG. 2 is a block diagram illustrating a reservation system, according to some example embodiments.

FIG. 2 is a block diagram illustrating a reservation system 124, according to some example embodiments. The reservation system 124 comprises a front-end server 202, a client module 204, a manager module 206, a listing module 208, a search module 210, and a transaction module 212. The one or more database(s) 126 include a client store 214, a manager store 216, a listing store 218, a query store 220, a transaction store 222, and a booking session store 224. The reservation system 124 may also contain different and/or other modules that are not described herein.

The reservation system 124 may be implemented using a single computing device or a network of computing devices, including cloud-based computer implementations. The computing devices may be server-class computers including one or more high-performance computer processors and random access memory, which may run an operating system such as Linux or the like. The operations of the reservation system 124 may be controlled either through hardware or through computer programs installed in non-transitory computer-readable storage devices such as solid-state devices or magnetic storage devices and executed by the processors to perform the functions described herein.

The front-end server 202 includes program code that allows client and manager client devices 110 to communicate with the reservation system 124. The front-end server 202 may utilize the API gateway server 120 and/or the web server 122 shown in FIG. 1. The front-end server 202 may include a web server hosting one or more websites accessible via a hypertext transfer protocol (HTTP), such that user agents, such as a web browser software application, may be installed on the client devices 110 and can send commands to and receive data from the reservation system 124. The front-end server 202 may also utilize the API gateway server 120 that allows software applications installed on client devices 110 to call to the API to send commands to and receive data from the reservation system 124. The front-end server 202 further includes program code to route commands and data to the other components of the reservation system 124 to carry out the processes described herein and respond to the client devices 110 accordingly.

The client module 204 comprises program code that allows clients (also referred to herein as "users" or "guests") to manage their interactions with the reservation system 124 and executes processing logic for client-related information that may be requested by other components of the reservation system 124. Each client is represented in the reservation system 124 by an individual client object having a unique client identifier (ID) and client profile, both of which are stored in the client store 214.

The client profile includes a number of client-related attribute fields that may include a profile picture and/or other identifying information, a geographical location, a client calendar, and so forth. The client's geographical location is either the client's current location (e.g., based on information provided by the client device 110), or the client's manually entered home address, neighborhood, city, state, or country of residence. The client location may be used to filter search criteria for time-expiring inventory relevant to a particular client or to assign default language preferences.

The client module 204 provides code for clients to set up and modify the client profile. The reservation system 124 allows each client to exchange communications, request transactions, and perform transactions with one or more managers.

The manager module 206 comprises program code that provides a user interface that allows managers (also referred to herein as "hosts" or "owners") to manage their interactions and listings with the reservation system 124 and executes processing logic for manager-related information that may be requested by other components of the reservation system 124. Each manager is represented in the reservation system 124 by an individual manager object having a unique manager ID and manager profile, both of which are stored in the manager store 216.

The manager profile is associated with one or more listings owned or managed by the manager and includes a number of manager attributes including transaction requests and a set of listing calendars for each of the listings managed by the manager.

The manager module 206 provides code for managers to set up and modify the manager profile listings. A user 106 of the reservation system 124 can be both a manager and a client. In this case, the user 106 will have a profile entry in both the client store 214 and the manager store 216 and be represented by both a client object and a manager object. The reservation system 124 allows the manager to exchange communications, respond to requests for transactions, and conduct transactions with other managers.

The listing module 208 comprises program code for managers to list trip items, such as time-expiring inventory, for booking by clients. The listing module 208 is configured to receive the listing from a manager describing the inventory being offered; a timeframe of its availability including one or more of the start date, end date, start time, and an end time; a price; a geographical location; images and description that characterize the inventory; and any other relevant information. For example, for an accommodation reservation system, a listing may include a type of accommodation (e.g., house, apartment, room, sleeping space, or other), a representation of its size (e.g., square footage, or number of rooms), the dates that the accommodation is available, and a price (e.g., per night, per week, per month, etc.). The listing module 208 allows a user 106 to include additional information about the inventory, such as videos, photographs, and other media.

The geographical location associated with the listing identifies the complete address, neighborhood, city, and/or country of the offered listing. The listing module 208 is also capable of converting one type of location information (e.g., mailing address) into another type of location information (e.g., country, state, city, and neighborhood) using externally available geographical map information.

The price of the listing is the amount of money a client needs to pay in order to complete a transaction for the inventory. The price may be specified as an amount of money per day, per week, per day, per month, and/or per season, or per another interval of time specified by the manager. Additionally, the price may include additional charges such as cleaning fees, pet fees, service fees, and taxes, or the listing price may be listed separately from additional charges.

Each listing is represented in the reservation system 124 by a listing object, which includes the listing information as provided by the manager and a unique listing ID, both of which are stored in the listing store 218. Each listing object is also associated with the manager object for the manager providing the listing.

Each listing object has an associated listing calendar. The listing calendar stores the availability of the listing for each time interval in a time period (each of which may be thought of as an independent item of time-expiring inventory), as specified by the manager or determined automatically (e.g., through a calendar import process). For example, a manager may access the listing calendar for a listing, and manually indicate the time intervals for which the listing is available for transaction by a client, which time intervals are blocked as not available by the manager, and which time intervals are already in transaction (e.g., booked) for a client. In addition, the listing calendar continues to store historical information as to the availability of the listing identifying which past time intervals were booked by clients, blocked, or available. Further, the listing calendar may include calendar rules (e.g., the minimum and maximum number of nights allowed for the inventory, a minimum or maximum number of nights needed between bookings, a minimum or maximum number of people allowed for the inventory, etc.). Information from each listing calendar is stored in the listing store 218.

Figure 3:
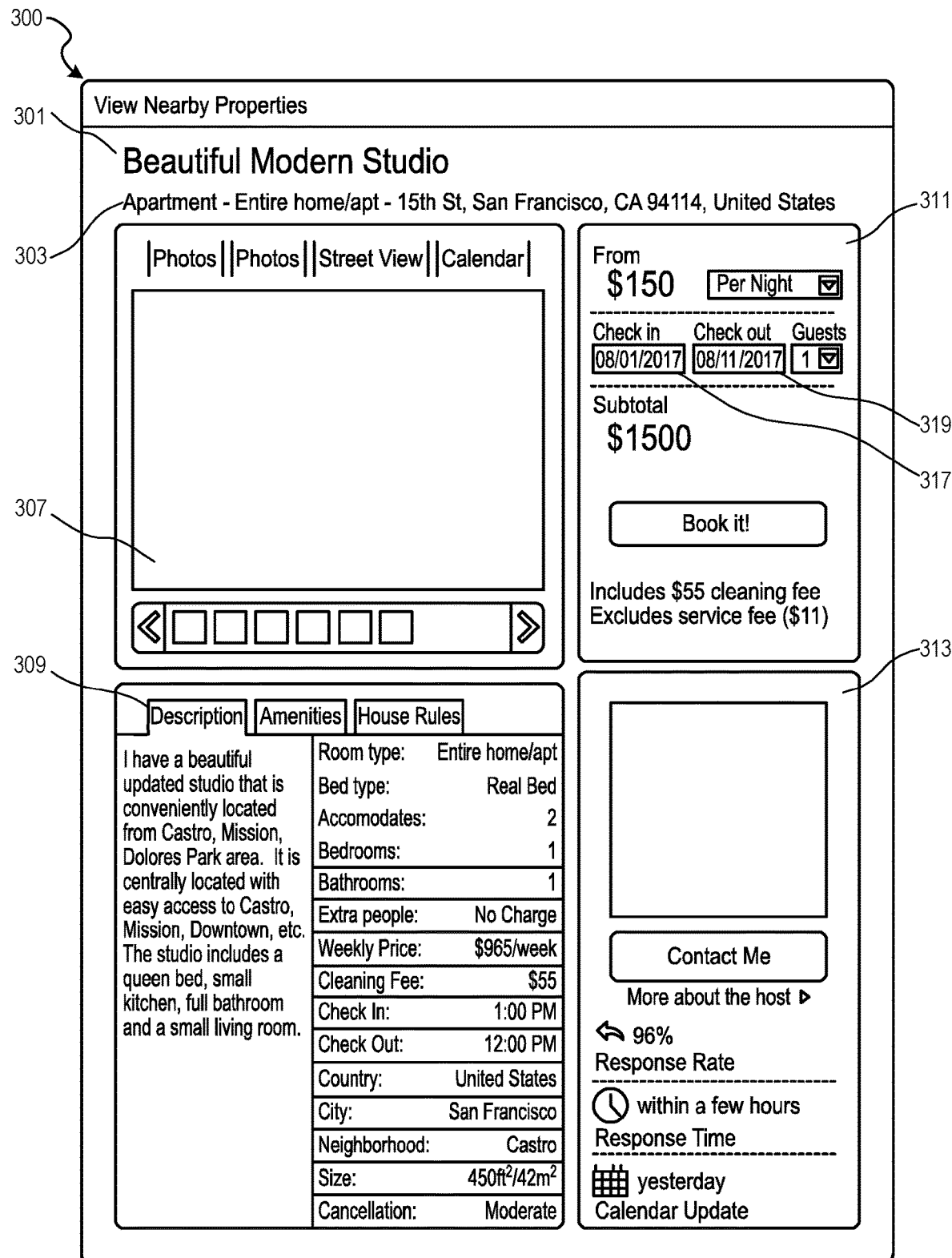
FIG. 3 illustrates an example user interface displaying an example listing for an accommodation, according to some example embodiments.

FIG. 3 illustrates an example user interface 300 for a description of a listing for a trip item (e.g., an apartment in San Francisco) in an online marketplace. The example listing shown in FIG. 3 is for accommodations in San Francisco. In other examples, the listing could be for a tour, local experience, transportation, or other trip item. The listing may include a title 301 and a brief description 303 of the trip item. The listing may further include photos of the trip item, maps of the area or location associated with the trip item, a street view of the trip item, a calendar of the trip item, and so forth, which may be viewed in area 307. The listing may include a detailed description 309, pricing information 311, and the listing host's information 313. The listing may further allow a user to select a date range for the trip item by entering or choosing specific check-in date 317 and check-out date 319.

Returning to FIG. 2, the search module 210 comprises program code configured to receive an input search query from a client and return a set of time-expiring inventory and/or listings that match the input query. Search queries are saved as query objects stored by the reservation system 124 in the query store 220. A query may contain a search location, a desired start time/date, a desired duration, a desired listing type, and a desired price range, and may also include other desired attributes or features of the listing. A potential client need not provide all the parameters of the query listed above in order to receive results from the search module 210. The search module 210 provides a set of time-expiring inventory and/or listings in response to the submitted query to fulfill the parameters of the submitted query. The online system may also allow clients to browse listings without submitting a search query, in which case the viewing data recorded will only indicate that a client has viewed the particular listing without any further details from the submitted search query. Upon the client providing input selecting a time-expiring inventory/listing to more carefully review for possible transaction, the search module 210 records the selection/viewing data indicating which inventory/listing the client viewed. This information is also stored in the query store 220.

The transaction module 212 comprises program code configured to enable clients to submit a contractual transaction request (also referred to as a formal request) to transact for time-expiring inventory. In operation, the transaction module 212 receives a transaction request from a client to transact for an item of time-expiring inventory, such as a particular date range for a listing offered by a particular manager. A transaction request may be a standardized request form that is sent by the client, which may be modified by responses to the request by the manager, either accepting or denying a received request form, such that agreeable terms are reached between the manager and the client. Modifications to a received request may include, for example, changing the date, price, or time/date range (and thus, effectively, which time-expiring inventory is being transacted for). The standardized form may require the client to record the start time/date, duration (or end time), or any other details that must be included for an acceptance to be binding without further communication.

The transaction module 212 receives the filled-out form from the client and, in one example, presents the completed request form including the booking parameters to the manager associated with the listing. The manager may accept the request, reject the request, or provide a proposed alternative that modifies one or more of the parameters. If the manager accepts the request (or the client accepts the proposed alternative), then the transaction module 212 updates an acceptance status associated with the request and the time-expiring inventory to indicate that the request was accepted. The client calendar and the listing calendar are also updated to reflect that the time-expiring inventory has been transacted on for a particular time interval. Other modules not specifically described herein allow the client to complete payment and the manager to receive payment.

The transaction module 212 may further comprise code configured to enable clients to instantly book a listing, whereby the online marketplace books or reserves the listing upon receipt of the filled-out form from the client.

The transaction store 222 stores requests made by clients. Each request is represented by a request object. The request includes a timestamp, a requested start time, and a requested duration or reservation end time. Because the acceptance of a booking by a manager is a contractually binding agreement with the client that the manager will provide the time-expiring inventory to the client at the specified times, all the information that the manager needs to approve such an agreement is included in the request. A manager response to a request comprises a value indicating acceptance or denial and a timestamp. Other models may allow for instant booking, as mentioned above.

The transaction module 212 may also provide managers and clients with the ability to exchange informal requests to transact. Informal requests are not sufficient to be binding upon the client or manager if accepted, and in terms of content, may vary from mere communications and general inquiries regarding the availability of inventory, to requests that fall just short of whatever specific requirements the reservation system 124 sets forth for formal transaction requests. The transaction module 212 may also store informal requests in the transaction store 222, as both informal and formal requests provide useful information about the demand for time-expiring inventory.

The booking session store 224 stores booking session data for all booking sessions performed by clients. Booking session data may include details about a listing that was booked and data about one or more other listings that were viewed (or seriously considered) but not booked by the client before booking the listing. For example, once a listing is booked, the transaction module 212 may send data about the listing or the transaction, viewing data that was recorded for the booking session, and so forth, to be stored in the booking session store 224. The transaction module 212 may utilize other modules or data stores to generate booking session data to be stored in the booking session store 224.

Figure 4:
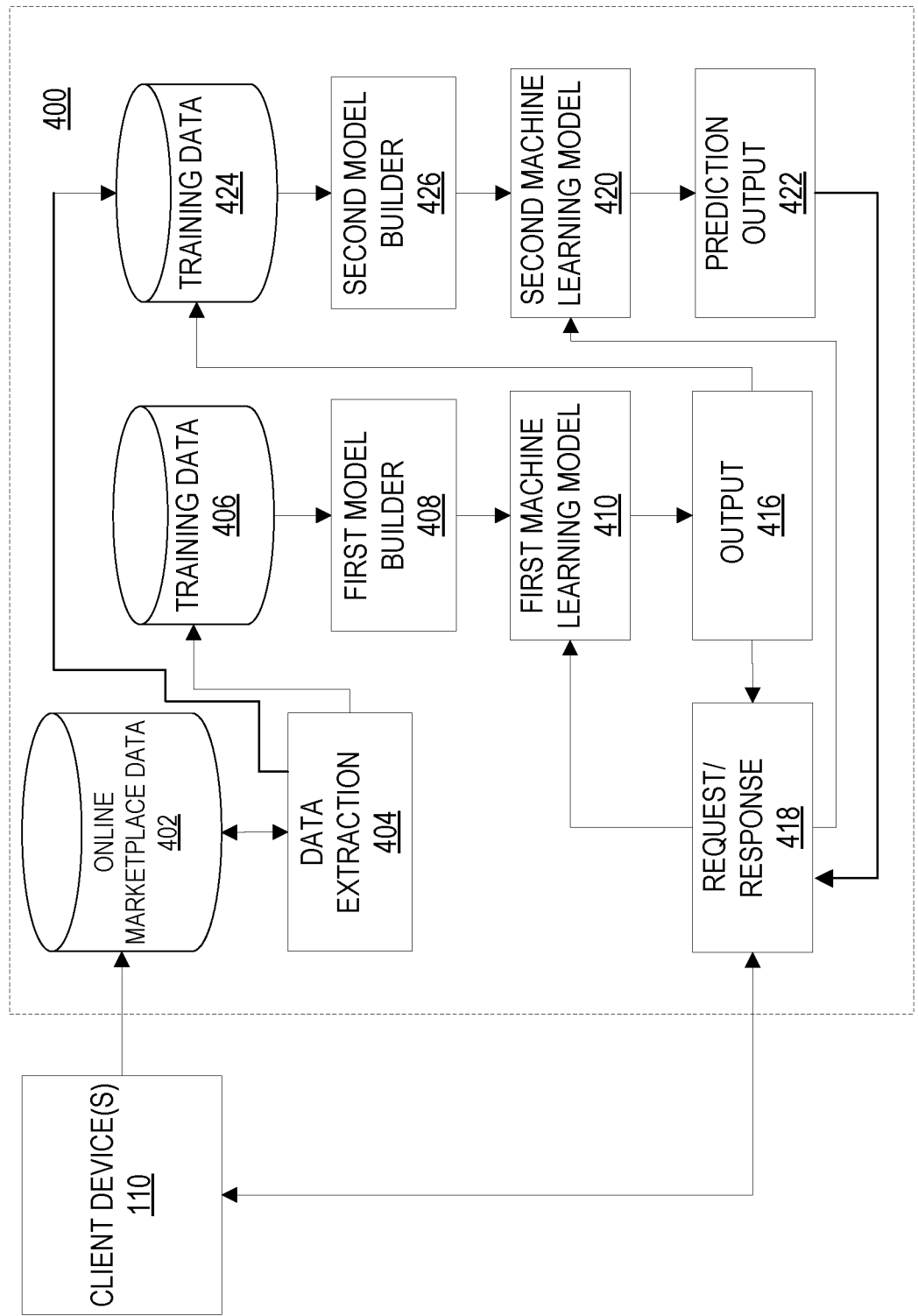
FIG. 4 is a block diagram illustrating a machine learning modeling system, according to some example embodiments.

FIG. 4 is a block diagram illustrating a machine learning modeling system 400 that may be part of the reservation system 124 or server system 102. Client devices 110 interact with the reservation system 124 or server system 102, thereby generating data related to the interactions with the system. For example, a client device 110 may be used to search for services (e.g., trip items such as accommodations, tours, transportation, etc.) in an online marketplace, view a list of services available in a given location, view individual listings for each service, book one or more services, send and receive messages to and from hosts or managers of a service, generate a review for a listing or host, and so forth. Moreover, a client device 110 may be used to list a service, manage a service, send and receive messages to and from guests interested in the service, generate a review for a user (e.g., guest), and so forth. These interactions and data associated with the interactions are stored in one or more databases. In FIG. 4 this is shown as online marketplace data 402. In other examples, this data may be stored in multiple databases, or in databases internal to the machine learning modeling system 400, external to the machine learning modeling system 400, or a combination of both.

The online marketplace data 402 may further comprise data about markets or locations of services. For example, the online marketplace data 402 may comprise location data for a market (e.g., neighborhood, city, state, country), number of services or listings available in a market, how many instant-book listings are available in the market, how many non-instant-book listings are available in the market, popularity of the market, proximity of nearby markets, and so forth. The market or location data may also be in one or more data stores and stored internally to the machine learning modeling system 400 and/or externally to the machine learning modeling system 400. The data stored in the online marketplace data 402 may be used for training a first machine learning model 410 and/or a second machine learning model 420.

This online marketplace data 402 may thus be received from client devices 110, from other datastores within the server system 102 or reservation system 124, and/or from third-party sources such as the third-party server 130. A data extraction component 404 extracts data from the online marketplace data 402 and stores the data as training data 406 and/or training data 424. For example, the data extraction component 404 may extract data related to users of the system, data related to hosts of the system, data related to markets associated with the system, data related to listings and listing features, and so forth. The data extraction component 404 may further generate listing features from data related to listings.

A first model builder 408 uses the training data 406 to train a first machine learning model 410 to generate a value for each of a plurality of price dependent listing features, as explained in further detail below. In one example a Neural Nets type of model is used for the first machine learning model. It is to be understood that other machine learning models may be used in other example embodiments. The first machine learning model 410 is tested for accuracy until a final first machine learning model 410 is trained and ready to use. Output 416 comprises the values and related data generated by the first machine learning model 410 for each of the plurality of the price dependent listing features.

Figure 5:
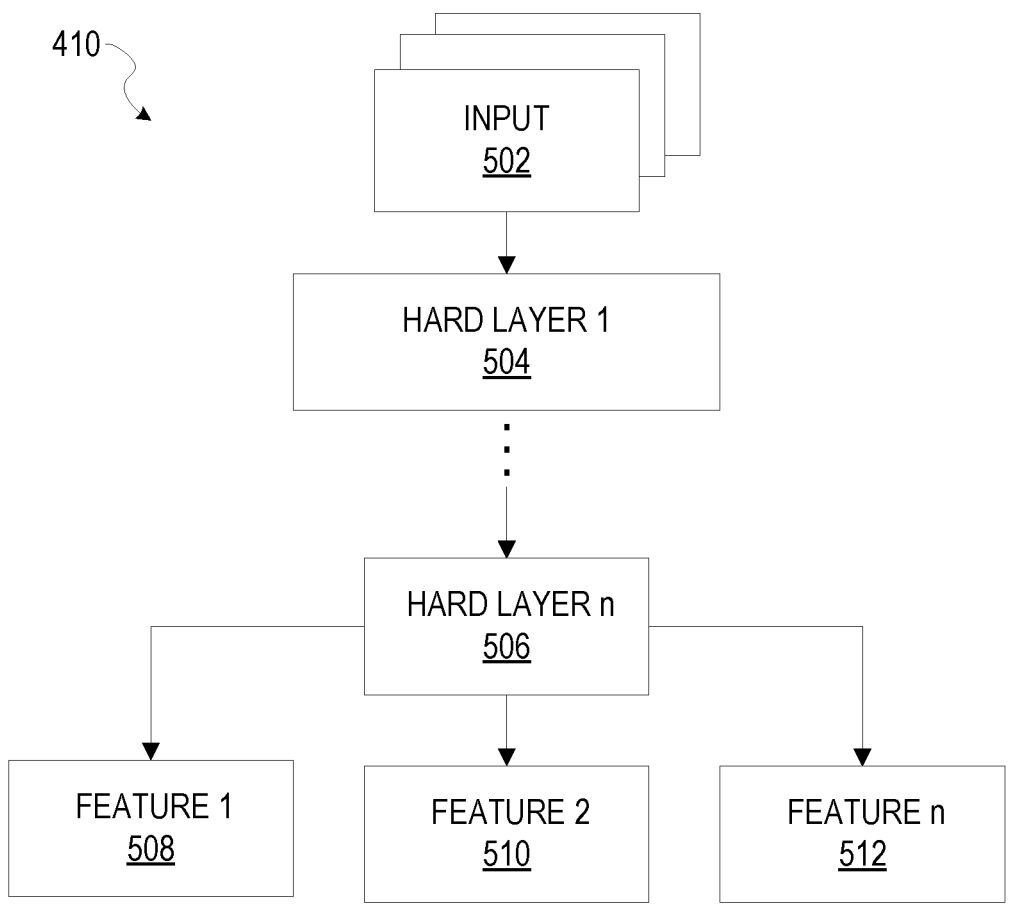
FIG. 5 illustrates an example machine learning model, according to some example embodiments.

FIG. 5 illustrates an example of a first machine learning model 410 comprising a plurality of hard layers 504, 506 (e.g., hard-parameter sharing layers) and a plurality of soft layers 508-512 (e.g., soft-parameter sharing layers), according to some example embodiments. Training data 406 is input via input component 502. The training data 406 may be input as one stream of data or in batches (e.g., with batch size of 200).

The hard layers 504, 506 (e.g., hard layers 1-$n$) learn correlations between all features input to the first machine learning model 410. Any number of hard layers may be used in various embodiments. Each hard layer 504, 506 may comprise a varying number of neurons. For example, a hard layer 1 may comprise 2048 neurons, a hard layer 2 may comprise 1024 neurons, a hard layer 3 may comprise 512 neurons, and so forth. In the early layers, shallow correlations are learned and as the data progresses to deeper layers, a higher level of correlation is learned between the features. More layers are more computationally expensive, and thus the machine learning model is slower with more layers. Moreover, more layers may cause the machine learning model to over fit where it very closely fits to the existing data and thus, may not do as well with new data. In one example embodiment, three hard layers are used to get the best results from the first machine learning model 410 and balance between accuracy and computational expense. More or less layers may be used in other example embodiments.

Each of the soft layers 508-512 correspond to a particular feature (e.g., feature 1, feature 2, feature n), such as a price dependent feature, as described further below. One option is to train a completely independent model for each of the features (e.g., feature 1, feature 2, feature n); however, this would be very computationally expensive. For example, if there are thirty price dependent features, then thirty completely independent models would have to be trained. Instead, example embodiments train one model (e.g., via multi-task learning) that takes the input 502 (e.g., price dependent features, price independent features, etc.) to learn a change to all of them at the same time. This method saves considerable resources and is much easier to maintain and update.

Returning to FIG. 4, the output 416 of the first machine learning model 410 is used as training data 424, in some example embodiments. Data may also be extracted from the online marketplace data 402 by the data extraction component 404 and used as training data 424. A second model builder 426 uses the training data 424 to train a second machine learning model 420 to predict a probability that a listing will be booked for a given date, as explained in further detail below. In one example a variation of an xgboost model is used for the second machine learning model. It is to be understood that other machine learning models may be used in other example embodiments. The second machine learning model 420 is tested for accuracy until a final second machine learning model 420 is trained and ready to use. Prediction output 422 comprises the probability that a listing will be booked for a given date that is output by the second machine learning model 420. For example, the probability is a value between 0 and 1 (e.g., 0.5, 0.7, etc.).

A request/response component 418 receives requests for data (e.g., from client devices 110) and results generated from output 416 of the first machine learning model 410 and/or prediction output 422 of the second machine learning model 420. The requests may comprise data that is input into the first machine learning model 410 and/or the second machine learning model 420. Other data (e.g., related to a user associated with the request, a listing associated with the request, etc.) may also be input into the first machine learning model 410 and/or the second machine learning model 420. The request/response component 418 also generates a response to each request based on the output 416 and/or prediction output 422 and sends the response to the client device 110.

Any one or more of the modules or components described herein may be implemented using one or more processors (e.g., by configuring such one or more processors to perform functions described for that module) and hence may include one or more of the processors. Any one or more of the modules described may be implemented using hardware alone (e.g., one or more of the processors of a machine) or a combination of hardware and software. For example, any module described of the machine learning modeling system 400 may physically include an arrangement of one or more of the processors (e.g., a subset of or among the one or more processors of the machine) configured to perform the operations described herein for that module. As another example, any module of the machine learning modeling system 300 may include software, hardware, or both, that configure an arrangement of one or more processors (e.g., among the one or more processors of the machine) to perform the operations described herein for that module. Accordingly, different modules of the machine learning modeling system 400 may include and configure different arrangements of such processors or a single arrangement of such processors at different points in time. Moreover, any two or more modules of the machine learning modeling system 400 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 6:
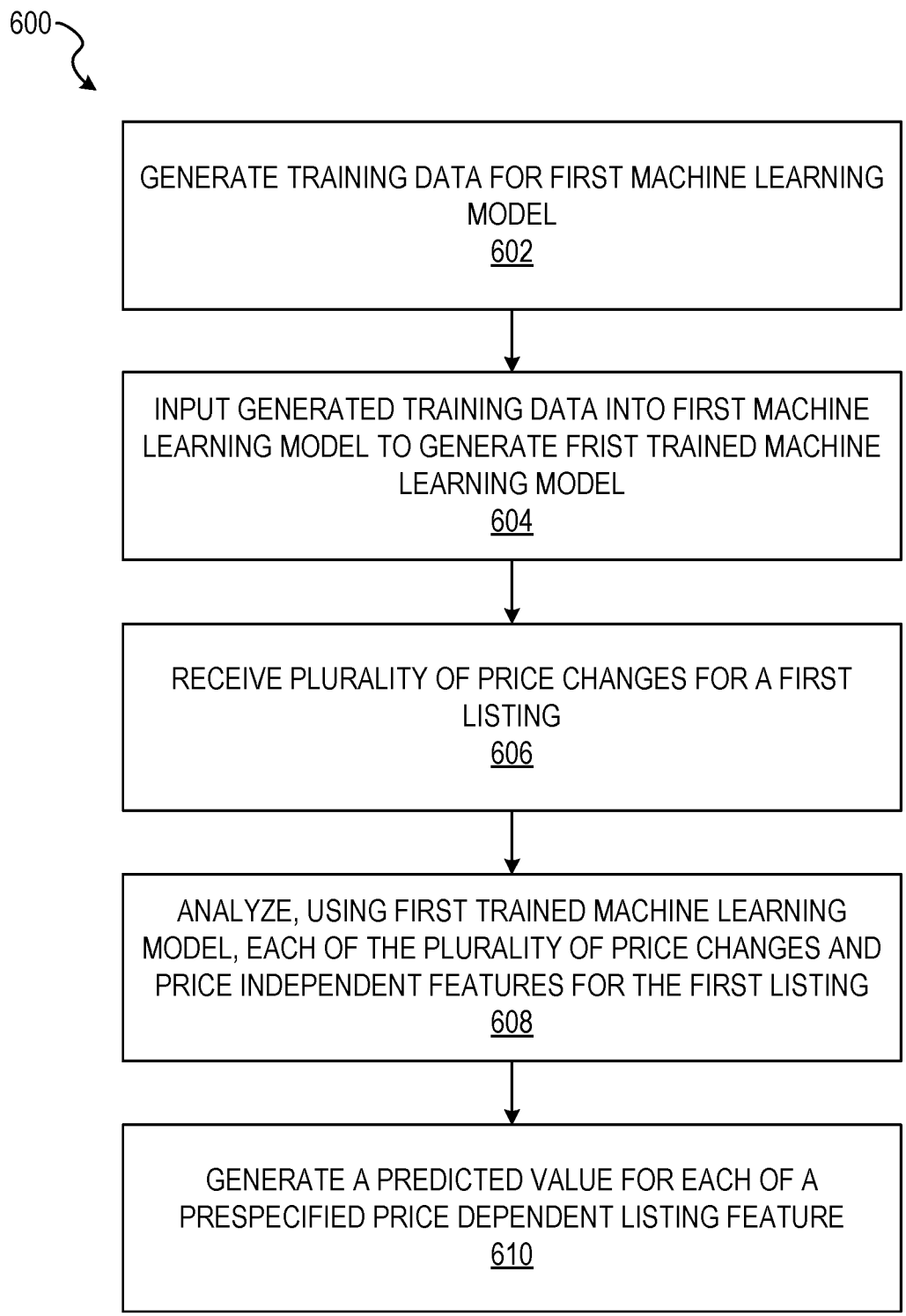
FIG. 6 is a flow chart illustrating aspects of a method for training and using a first machine learning model, according to some example embodiments.

FIG. 6 is a flow chart illustrating aspects of a method 600 for processing a request for services in a given location, according to some example embodiments. For illustrative purposes, the method 600 is described with respect to the networked system 100 of FIG. 1, the reservation system 124 of FIG. 2, and the machine learning modeling system 400 of FIG. 4. It is to be understood that the method 600 may be practiced with other system configurations in other embodiments.

In operation 602, a computing system (e.g., the server system 102 and/or reservation system 124) generates training data for a first machine learning model to predict how a change in listing price effects a plurality of listing features. In one example, the listing features comprise a listing price (e.g., a price of a night stay in an accommodation, a price of a tour or other experience, etc.), price independent features, and price dependent features.

Price independent features are features that do not change based on a change in a listing price. For example, if a listing host or manager changes a price for an accommodation from $200 a night to $500 a night, features such as the number of rooms available, whether or not the accommodation has Wi-Fi or a pool, and the like, do not change based on the change in price. Price dependent features, however, have a high correlation with the listing price. For example, a price change will affect the number of users (e.g., potential guests) that will view the listing, how the listing will appear in results of a search for listings in a particular market, the percentage of time a listing is occupied, and so forth. For instance, if the listing host changes the price from $200 to $500, fewer users are likely to be interested or be able to afford the accommodation at the higher price than the lower price, and thus, fewer users are likely to view the listing or book the listing.

Generating training data is technically challenging in an online marketplace with so many features for each listing and with so many listings. For example, hosts may change the price of a listing, and then change it right back because they decided they did not like the new price or the change was made accidently. As another example, a host may change the listing price multiple times in a short period or multiple times throughout the year. It is extremely hard to isolate all these factors to determine if and how the price change affects and changes a listing view or other price dependent feature.

In one example embodiment, these technical challenges are addressed by using and analyzing listings that have only a single price change in a predetermined time period (e.g., from Sep. 7, 2017 to Mar. 7, 2018, within the last 90 days, within the prior year, etc.). Thus, listings that have more than one price change in the predetermined time period are not considered for training data since these listings may not provide an accurate analysis of if and how the price changes in these listings affected price dependent features. For example, it may not be clear if the effect on price dependent features was because of the first price change or the second price change, and so forth.

Moreover, in some example embodiments, the computing system only uses and analyzes listings where the single price change occurred at least a predetermined amount of time after a start date of the predetermined time period. For example, the computing system will only use listings where the single price change occurred after 7 days from the start date (e.g., Sep. 7, 2017) of the predetermined time period (e.g., Sep. 7, 2017 to Mar. 7, 2018).

Accordingly, in one example, the computing system generates the training data by accessing data generated in an online marketplace (e.g., online marketplace data 402), as explained above. The computing system analyzes the data generated in an online market place to determine a plurality of listings that have only a single price change in a predetermined time period (e.g., searching for a change in a price record for each listing). The computing system generates listing features for each of the plurality of listings that have only a single price change in the predetermined time period and stores as training data the generated listing features for each of the plural of listings that have only a single price change in the predetermined time period (e.g., in one or more databases 120 or 406). As explained above, listing features may comprise a listing price, price dependent features, and price independent features.

Some example price dependent listing features comprise a number of listing views (e.g., the number of views of the listing by users), a price discount (e.g., weekly or monthly price discount), a percentage of time a listing is occupied (e.g., 70%), a number of users that looked (e.g., viewed) at a listing within a certain time period (e.g., last 90 days, within certain dates, for all time), a number of times users see a listing in a first results page for listings (e.g., in a results page for listings in a particular market (e.g., San Francisco)), click-through rates for active listings in the first results page, extra charges (e.g., cleaning fee, extra guest fee, etc.), and the percentage of time a listing is occupied of available dates for the listing (e.g., excludes dates that the listing is blocked by a host). All these features, a subset of these features, or additional features can be generated for each of the plurality of listings. In one example, these features are computed and stored in an ongoing basis for each listing.

Some examples of price independent listing features comprise a number of bedrooms associated with the listing, whether the listing has wireless internet, a type of accommodation (e.g., entire home, apartment, room, cabin, tree house, camper, etc.), a number of bathrooms associated with the listing, whether the listing has a kitchen, a number of beds associated with the listing, location (e.g., San Francisco), market data (e.g., number of listings in the location, popularity of the location, etc.), market demand for the overall market of the listing, and so forth. All of these features, a subset of these features, or additional features can be generated for each of the plurality of listings.

In operation 604, the computing system inputs the generated training data into the first machine learning model to generate a first trained machine learning model, as explained above with respect to FIG. 4. As explained above with respect to FIG. 5, in one example embodiment, the first machine learning model comprises a plurality of hard layers for learning correlations between listing features and a plurality of soft layers, with each soft layer used for learning correlations for a prespecified listing feature. In one example, a prespecified listing feature is a price dependent listing feature.

Figure 7:
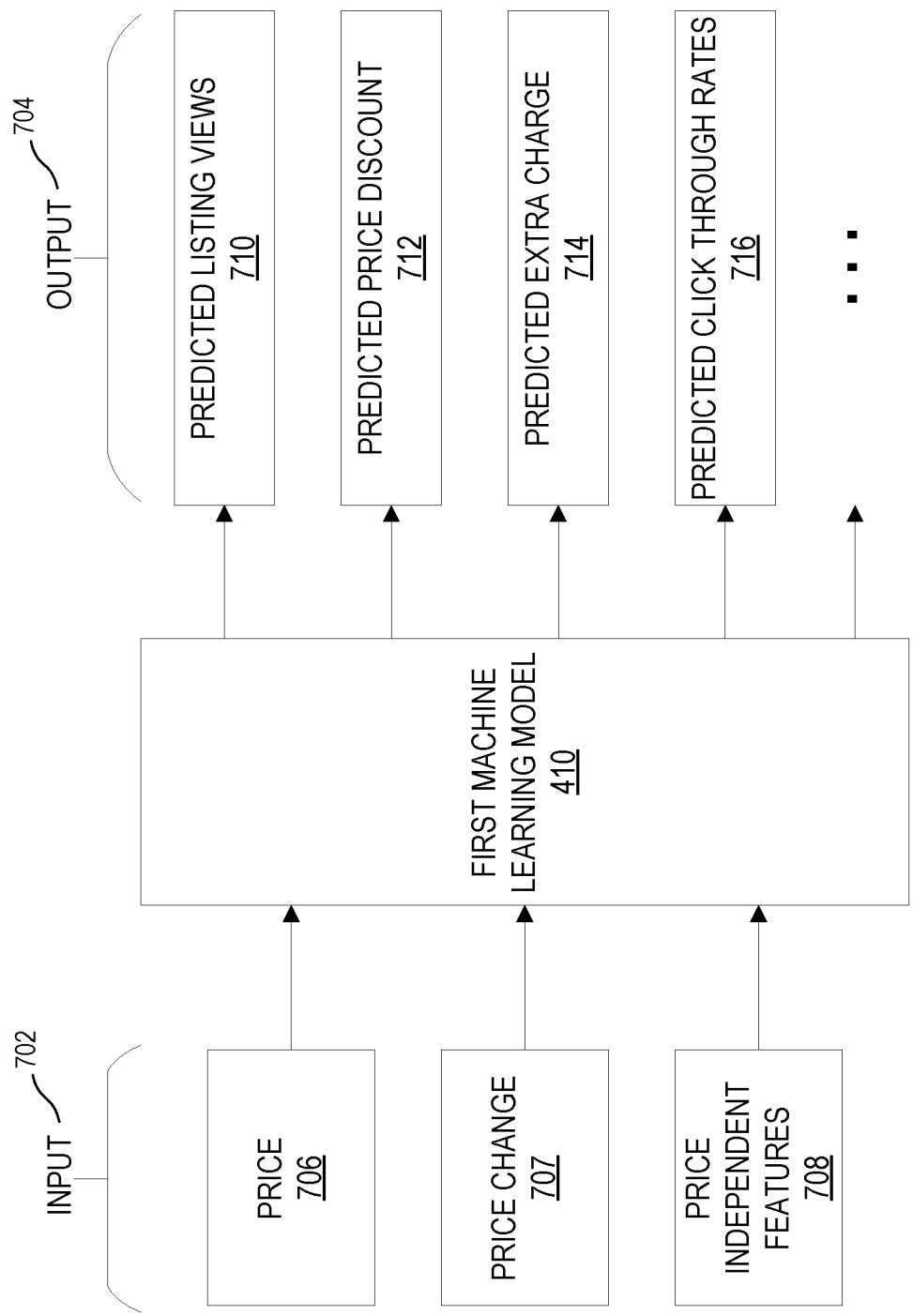
FIG. 7 illustrates example input and output for a first machine learning model, according to some example embodiments

Once the first machine learning model is trained and tested, it is ready to be used to generate predicted values for price dependent features for a given listing based on proposed or actual price change for the given listing. FIG. 7 illustrates example input 702 and output 704 for a first machine learning model 410, according to some example embodiments. For example, the listing price 706 (e.g., prior to the actual price change or the current listing price if the price change is only a proposed price change), the price change 707 (e.g., actual or proposed), and price independent features 708 (e.g., generated from online market data 402 and/or other data source(s)) associated with the listing, are input into the trained first machine learning model 410. The computing system analyzes, using the first trained machine learning model 410, the input of the price 706, price change 707, and price independent features 708 for the given listing and generates a predicted value 710-716 for each of a prespecified price dependent feature. For example, the predicted listing views 710 may be a value of 20, a predicted price discount 712 may be a price value or discount amount (e.g., 25%), the predicted extra charge 714 may be a price value of $125, the predicted click through rate 716 may be a number of click throughs or a percent of click throughs, and so forth for each prespecified dependent listing feature.

In some example embodiments, multiple price changes for a given listing may be analyzed. For example, a host may wish to see the results of raising a listing price of $200 to different price points, such as $225, $250, $275, and $300. In another example, there may not be enough actual data to generate an accurate demand curve for the first listing because the price has never changed, or the price has only changed once, and so the reservation system (or third-party server 130 or other system or entity) may utilize the first trained machine learning model to generate more data for the demand curve. In yet another example, the data may also be used to train a second machine learning model and/or to be input into a second machine learning model to predict a probability of booking for a given date, as explained further below.

Returning to FIG. 6, in operation 606, the computing system receives a plurality of price changes for a first listing (e.g., from one or more client devices 10, the reservation system 124, the server system, third party servers 130, etc.), and in operation 608, the computing system analyzes, using the first trained machine learning model, each of the plurality of price changes and price independent listing features for the first listing to determine a predicted value for each of a prespecified price dependent listing feature for each of the plurality of price changes for the first listing. In operation 610, the computing system generates, using the first trained machine learning model, the predicted value for each of the prespecified price dependent listing features for each of the plurality of price changes for the first listing.

In one example, the computing system uses the predicted value for each of the prespecified price dependent listing features for each of the plurality of price changes for the first listing to generate data for a demand curve. For example, a computing system generates data for a demand curve for the first listing using a current listing price and each of the plurality of price changes and associated predicted values for each prespecified price dependent listing feature. The computing system then generates the demand curve from the generated data. The demand curve illustrates the probability that the first listing will be booked for a given date for a plurality of price values. The demand curve can be used to generate a recommendation for a listing based on the optimal price indicated in the generated demand curve. In one example, the recommendation is provided to the host of the listing.

In another example, the computing system uses the predicted value for each of the prespecified price dependent listing features for each of the plurality of price changes for the first listing as training data for a second machine learning model (e.g., second machine learning model 420) to train the second machine learning model to predict a probability that a listing will be booked for a given date. Accordingly, the computing system stores the predicted value for each of the prespecified price dependent listing features for each of the plurality of price changes for the first listing as training data (e.g., training data 424).

To train the second machine learning model, the computing system inputs each of the plurality of price changes and associated predicted values for each prespecified price dependent listing feature as training data into the second machine learning model to generate a second trained machine learning model to predict a probability that a listing will be booked for a given date. The computing system may then analyze, using the second trained machine learning model, a listing price for the first listing, listing features for the first listing, and each of the plurality of price changes and associated predicted values for each prespecified price dependent listing feature and generate, using the second trained machine learning model, a probability that the first listing will be booked for the given date. The computing system can then analyze the probability output by the second trained machine learning model to determine the likelihood that the first listing will be booked for a given data. In one example, the computing system compares the probability output by the second trained machine learning model to a predetermined threshold to determine whether it is likely to be booked or not. For example, the predetermined threshold may be 0.7 where a probability output greater than or equal to 0.7 is interpreted as a likelihood to be booked and a probability output less than 0.7 is interpreted as not likely to be booked. The computing system can provide this information to a host, provide a recommendation based on this information to a host, and so forth.

Figure 8:
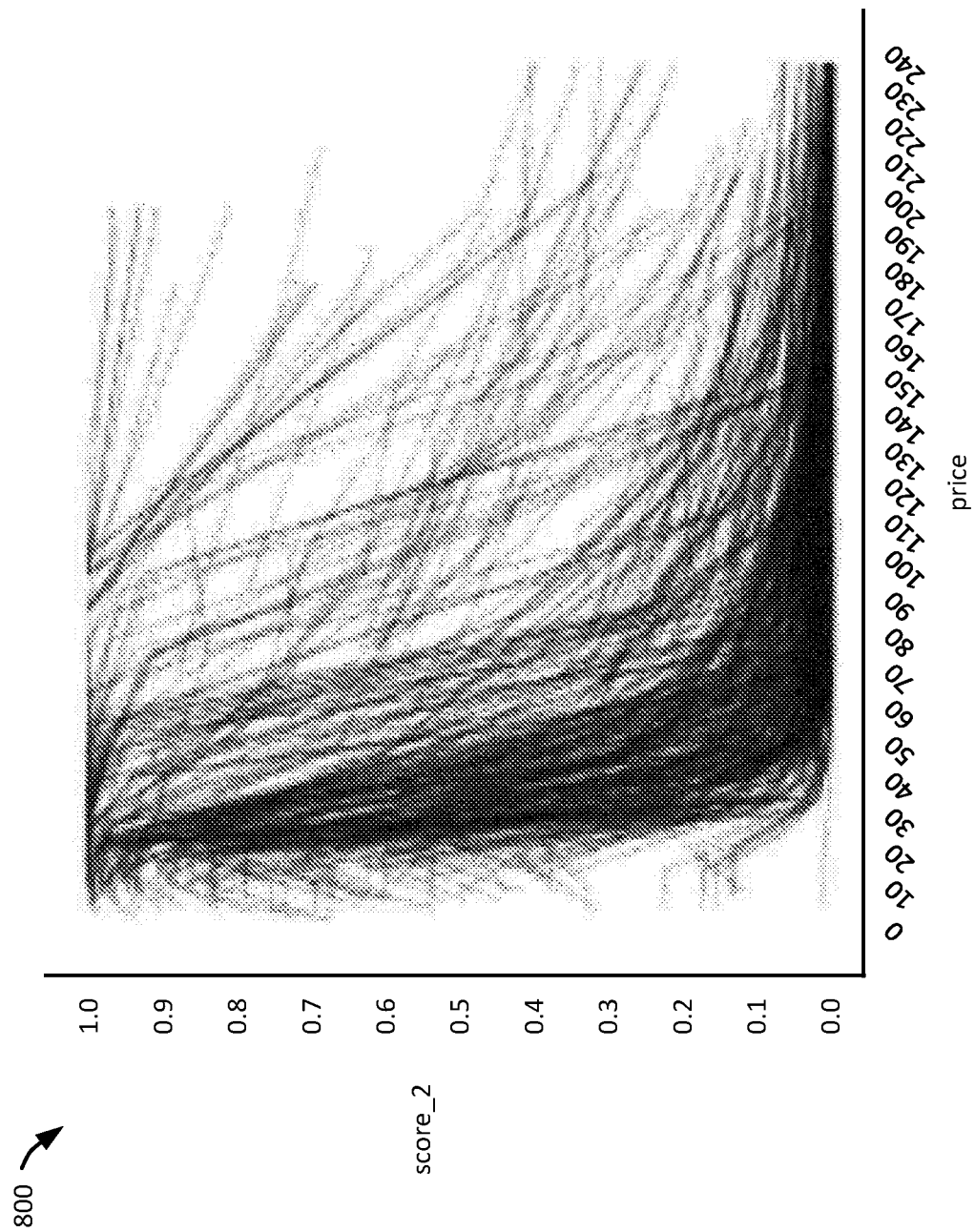
FIGS. 8-12 illustrate example demand curves, according to some example embodiments.
Figure 9:
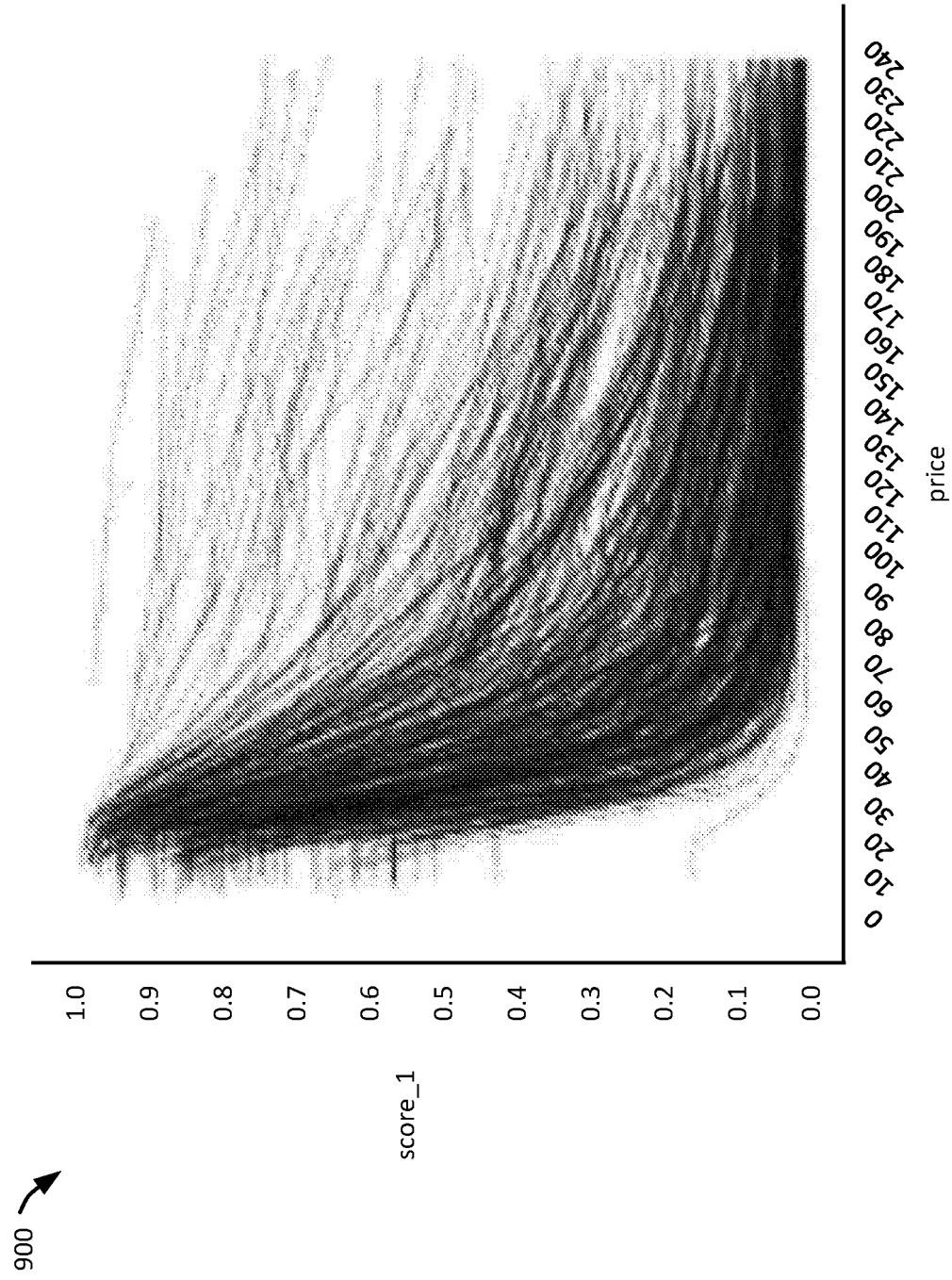
Figure 10:
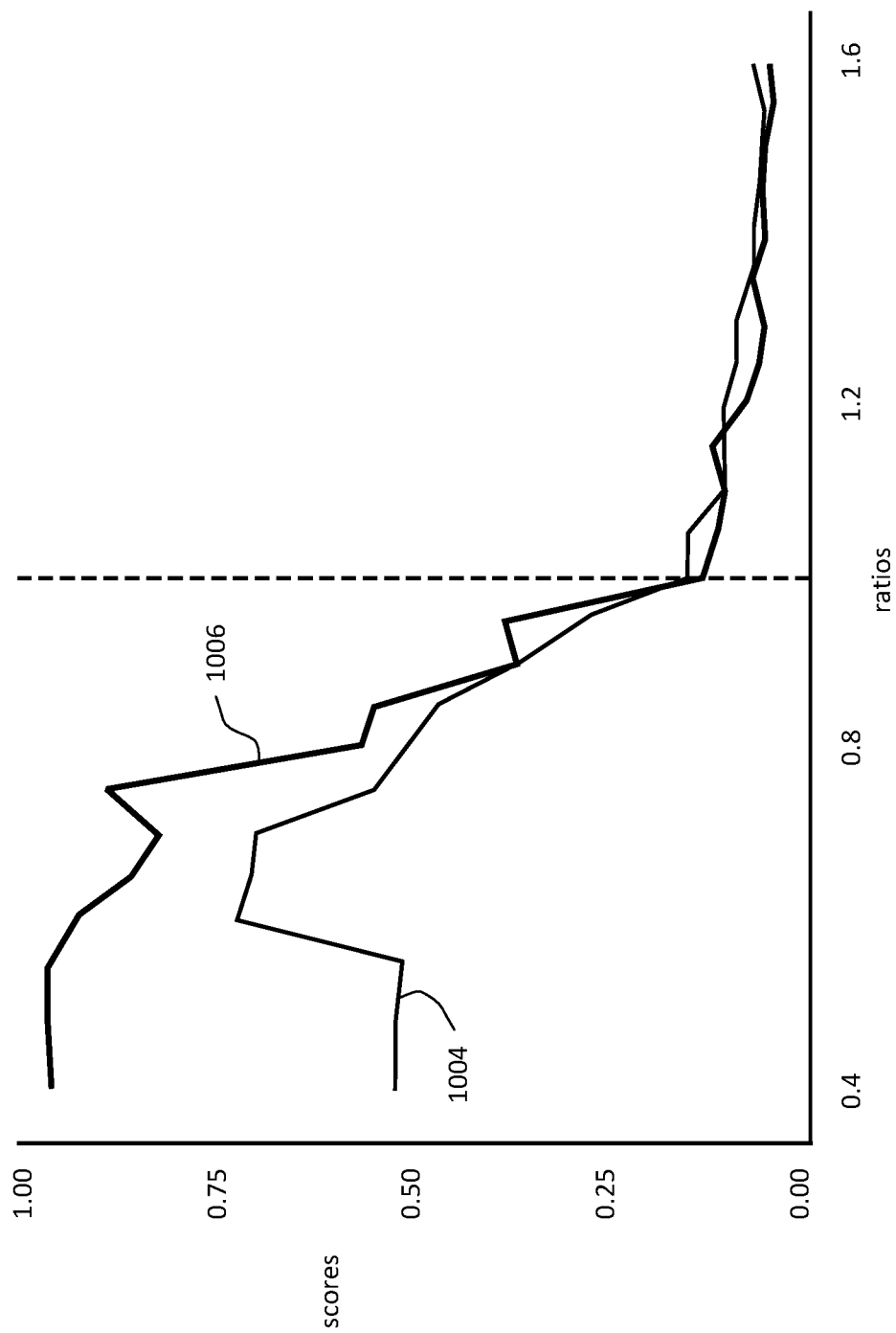
Figure 11:
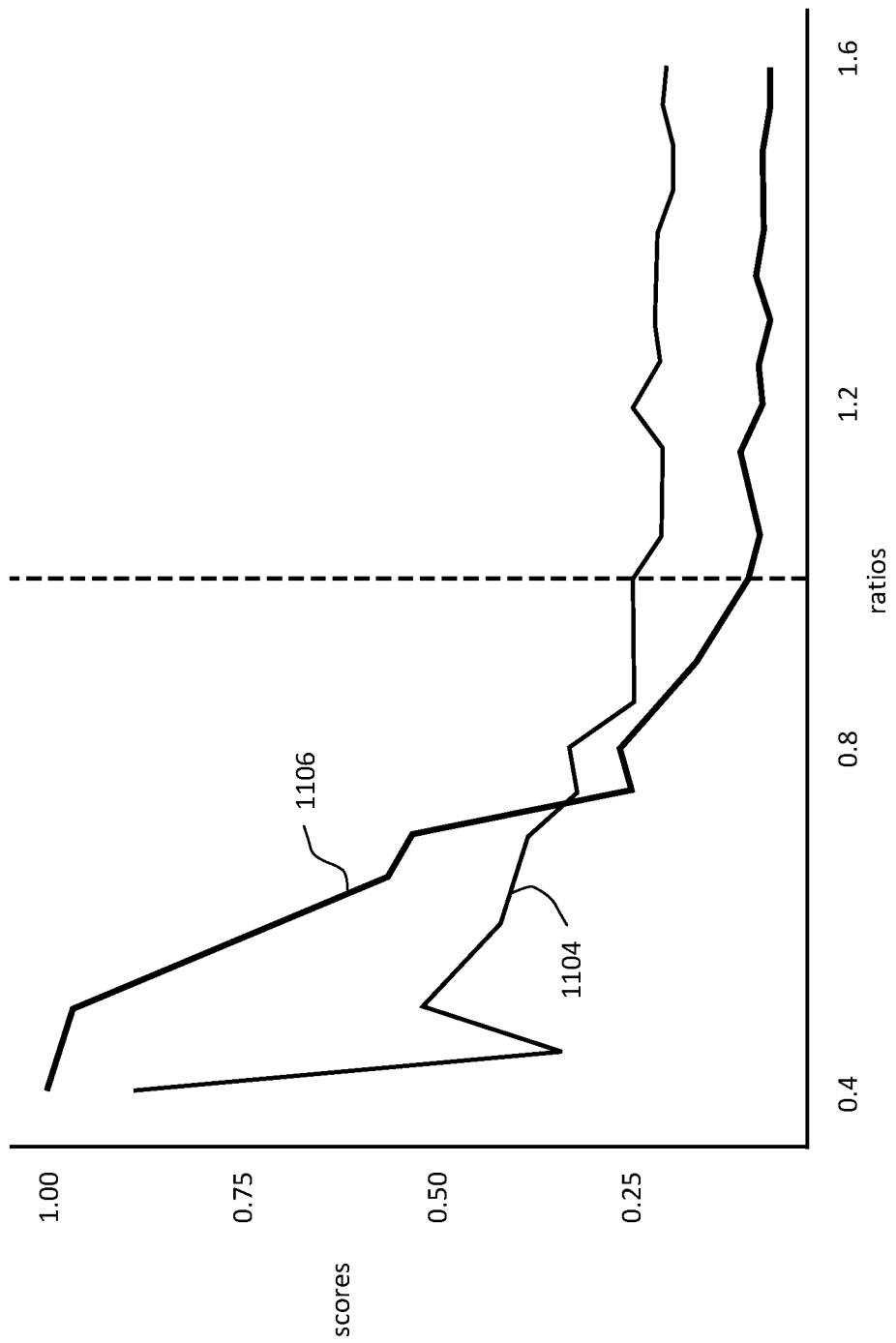
Figure 12:
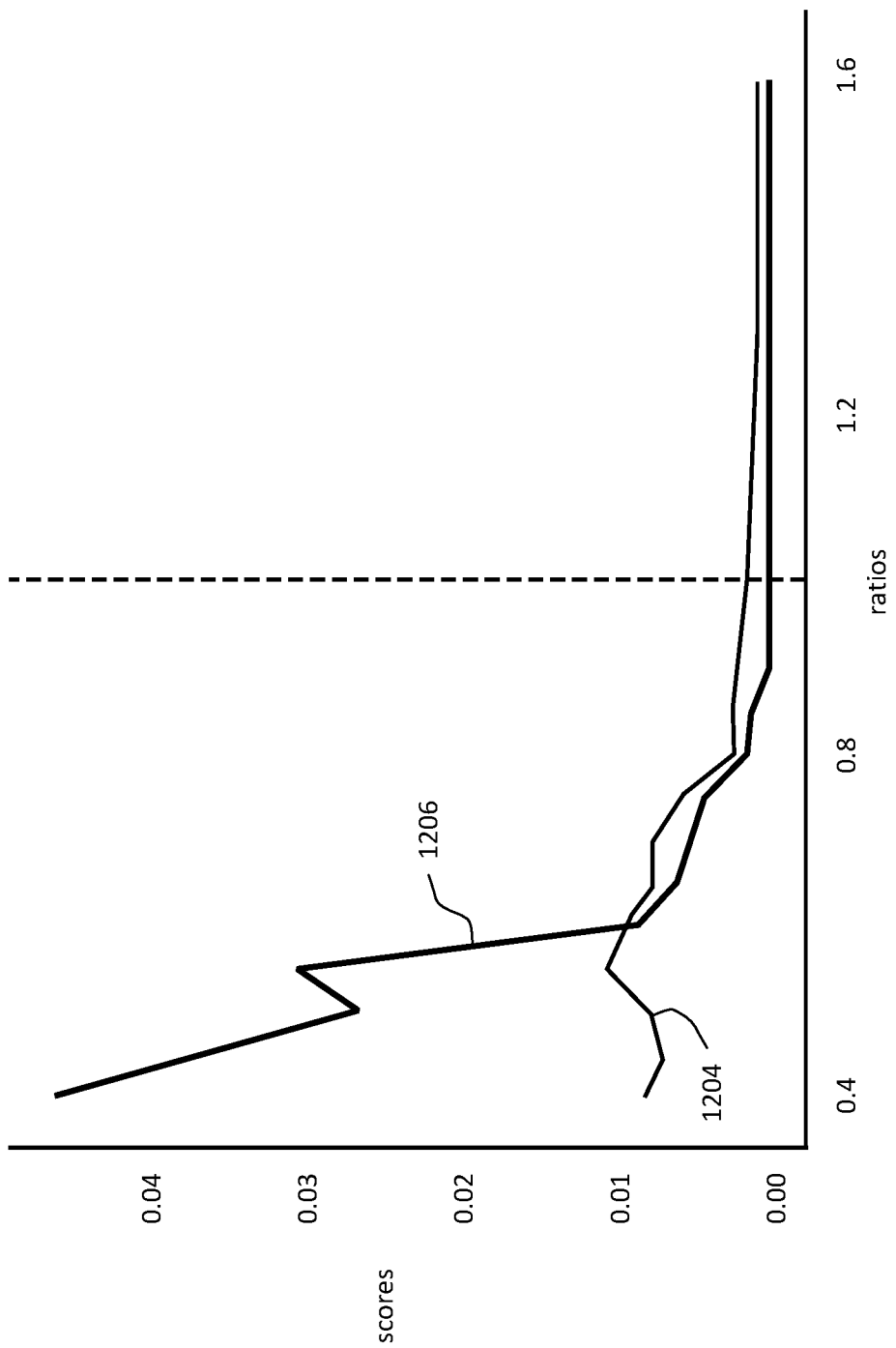

Example embodiments provide a number of advantages, as explained above. For example, example embodiments provide for a more accurate demand curve because synthetically generated data can be used in additional to actual data to produce more data points and thus a smoother and more accurate demand curve. FIG. 8 illustrates a demand curve 800 generated from actual data (e.g., less data points) and FIG. 9 illustrates a demand curve 900 generated using the first trained machine learning model described herein. As can be seen, the demand curve 900 is smoother, and thus more accurate, than the demand curve 800. FIGS. 10-12 illustrate demand curves for individual listings 1002, 1102, and 1202. FIG. 10 shows a demand curve 1004 using actual data (e.g., less data points) and a demand curve 1006 generated using the first trained machine learning model described herein. FIG. 11 shows a demand curve 1104 using actual data (e.g., less data points) and a demand curve 1106 generated using the first trained machine learning model described herein. FIG. 12 shows a demand curve 1204 using actual data (e.g., less data points) and a demand curve 1206 generated using the first trained machine learning model described herein.

The following examples describe various embodiments of methods, machine-readable media, and systems (e.g., machines, devices, or other apparatus) discussed herein.

Example 1. A method, comprising:
  receiving, by a computing system, a plurality of price changes for a first listing in an online marketplace;
  analyzing, by the computing system using a first trained machine learning model for predicting how a change in listing price effects a plurality of listing features, each of the plurality of price changes and price independent listing features for the first listing to determine a predicted value for each of a prespecified price dependent listing feature for each of the plurality of price changes for the first listing;
  generating, by the computing system using the first trained machine learning model, the predicted value for each of the prespecified price dependent listing features for each of the plurality of price changes for the first listing; and
  inputting, by the computing system, each of the plurality of price changes and associated predicted values for each prespecified price dependent listing feature as training data into a second machine learning model to generate a second trained machine learning model to predict a probability that a listing will be booked for a given date.

Example 2. A method according to example 1, wherein before receiving the plurality of price changes for a first listing in an online marketplace the method comprises:
  generating, by the computing system, training data for the first machine learning model to predict how a change in listing price effects a plurality of listing features by:
    analyzing data generated in an online market place to determine a plurality of listings that have only a single price change in a predetermined time period;
    generating listing features for each of the plurality of listings that have only a single price change in the predetermined time period; and
    storing as training data the generated listing features for each of the plural of listings that have only a single price change in the predetermined time period; and
  inputting, by the computing system, the generated training data into the first machine learning model to generate a first trained machine learning model, the first machine learning model comprising a plurality of hard layers for learning correlations between listing features and a plurality of soft layers, each soft layer for learning correlations for a prespecified listing feature.

Example 3. A method according to any of the previous examples, wherein analyzing the data generated in the online marketplace to determine listings that have only a single price change in the predetermined time period further comprises analyzing the data generated to determine that the single price change occurred at least a predetermined amount of time after a start date of the time period.

Example 4. A method according to any of the previous examples, further comprising:
  generating data for a demand curve for the first listing using a current listing price and each of the plurality of price changes and associated predicted values for each prespecified price dependent listing feature, the demand curve to illustrate the probability that the first listing will be booked for a given date for a plurality of price values; and
  generating the demand curve from generated data.

Example 5. A method according to any of the previous examples, further comprising:
  generating a recommended price for a listing based on an optimal price indicated in the generated demand curve.

Example 6. A method according to any of the previous examples, further comprising:
  analyzing, using the second trained machine learning model, a listing price for the first listing, listing features for the first listing, and each of the plurality of price changes and associated predicted values for each prespecified price dependent listing feature; and
  generating, using the second trained machine learning model, a probability that the first listing will be booked for the given date.

Example 7. A method according to any of the previous examples, wherein price dependent listing features comprise at least one of number of listing views, price discount, percentage of time a listing is occupied, a number of users that looked at a listing within a certain time period, a number of times users see a listing in a first results page for listings, click-through rates for active listings in the first results page, extra charges, and the percentage of time a listing is occupied of available dates for the listing.

Example 8. A server computer comprising:
  a memory that stores instructions; and
  one or more processors configured by the instructions to perform operations comprising:
    receiving, by a computing system, a plurality of price changes for a first listing in an online marketplace;
    analyzing, using a first trained machine learning model for predicting how a change in listing price effects a plurality of listing features, each of the plurality of price changes and price independent listing features for the first listing to determine a predicted value for each of a prespecified price dependent listing feature for each of the plurality of price changes for the first listing;
    generating, using the first trained machine learning model, the predicted value for each of the prespecified price dependent listing features for each of the plurality of price changes for the first listing; and
    inputting each of the plurality of price changes and associated predicted values for each prespecified price dependent listing feature as training data into a second machine learning model to generate a second trained machine learning model to predict a probability that a listing will be booked for a given date.

Example 9. A server according to any of the previous examples, wherein before receiving the plurality of price changes for a first listing in an online marketplace the operations comprise:
generating training data for the first machine learning model to predict how a change in listing price effects a plurality of listing features by:
analyzing data generated in an online market place to determine a plurality of listings that have only a single price change in a predetermined time period;
generating listing features for each of the plurality of listings that have only a single price change in the predetermined time period; and
storing as training data the generated listing features for each of the plural of listings that have only a single price change in the predetermined time period; and
inputting the generated training data into the first machine learning model to generate a first trained machine learning model, the first machine learning model comprising a plurality of hard layers for learning correlations between listing features and a plurality of soft layers, each soft layer for learning correlations for a prespecified listing feature.

Example 10. A server according to any of the previous examples, wherein analyzing the data generated in the online marketplace to determine listings that have only a single price change in the predetermined time period further comprises analyzing the data generated to determine that the single price change occurred at least a predetermined amount of time after a start date of the time period.

Example 11. A server according to any of the previous examples, the instructions further comprising:
generating data for a demand curve for the first listing using a current listing price and each of the plurality of price changes and associated predicted values for each prespecified price dependent listing feature, the demand curve to illustrate the probability that the first listing will be booked for a given date for a plurality of price values; and
generating the demand curve from generated data.

Example 12. A server according to any of the previous examples, the instructions further comprising:
generating a recommended price for a listing based on an optimal price indicated in the generated demand curve.

Example 13. A server according to any of the previous examples, the instructions further comprising:
analyzing, using the second trained machine learning model, a listing price for the first listing, listing features for the first listing, and each of the plurality of price changes and associated predicted values for each prespecified price dependent listing feature; and
generating, using the second trained machine learning model, a probability that the first listing will be booked for the given date.

Example 14. A server according to any of the previous examples, wherein price dependent listing features comprise at least one of number of listing views, price discount, percentage of time a listing is occupied, a number of users that looked at a listing within a certain time period, a number of times users see a listing in a first results page for listings, click-through rates for active listings in the first results page, extra charges, and the percentage of time a listing in occupied of available dates for the listing.

Example 15. A non-transitory computer-readable medium comprising instructions stored thereon that are executable by at least one processor to cause a computing device associated with a first data owner to perform operations comprising:
receiving, by a computing system, a plurality of price changes for a first listing in an online marketplace;
analyzing, using a first trained machine learning model for predicting how a change in listing price effects a plurality of listing features, each of the plurality of price changes and price independent listing features for the first listing to determine a predicted value for each of a prespecified price dependent listing feature for each of the plurality of price changes for the first listing;
generating, using the first trained machine learning model, the predicted value for each of the prespecified price dependent listing features for each of the plurality of price changes for the first listing; and
inputting each of the plurality of price changes and associated predicted values for each prespecified price dependent listing feature as training data into a second machine learning model to generate a second trained machine learning model to predict a probability that a listing will be booked for a given date.

Example 16. A non-transitory computer-readable medium according to any of the previous examples, wherein before receiving the plurality of price changes for a first listing in an online marketplace the operations comprise:
generating training data for the first machine learning model to predict how a change in listing price effects a plurality of listing features by:
analyzing data generated in an online market place to determine a plurality of listings that have only a single price change in a predetermined time period;
generating listing features for each of the plurality of listings that have only a single price change in the predetermined time period; and
storing as training data the generated listing features for each of the plural of listings that have only a single price change in the predetermined time period; and
inputting the generated training data into the first machine learning model to generate a first trained machine learning model, the first machine learning model comprising a plurality of hard layers for learning correlations between listing features and a plurality of soft layers, each soft layer for learning correlations for a prespecified listing feature.

Example 17. A non-transitory computer-readable medium according to any of the previous examples, wherein analyzing the data generated in the online marketplace to determine listings that have only a single price change in the predetermined time period further comprises analyzing the data generated to determine that the single price change occurred at least a predetermined amount of time after a start date of the time period.

Example 18. A non-transitory computer-readable medium according to any of the previous examples, the instructions further comprising:
generating data for a demand curve for the first listing using a current listing price and each of the plurality of price changes and associated predicted values for each prespecified price dependent listing feature, the demand curve to illustrate the probability that the first listing will be booked for a given date for a plurality of price values;

generating the demand curve from generated data; and generating a recommended price for a listing based on an optimal price indicated in the generated demand curve.

Example 19. A non-transitory computer-readable medium according to any of the previous examples, the instructions further comprising:

analyzing, using the second trained machine learning model, a listing price for the first listing, listing features for the first listing, and each of the plurality of price changes and associated predicted values for each pre-specified price dependent listing feature; and generating, using the second trained machine learning model, a probability that the first listing will be booked for the given date.

Example 20. A non-transitory computer-readable medium according to any of the previous examples, wherein price dependent listing features comprise at least one of number of listing views, price discount, percentage of time a listing is occupied, a number of users that looked at a listing within a certain time period, a number of times users see a listing in a first results page for listings, click-through rates for active listings in the first results page, extra charges, and the percentage of time a listing in occupied of available dates for the listing.

Figure 13:
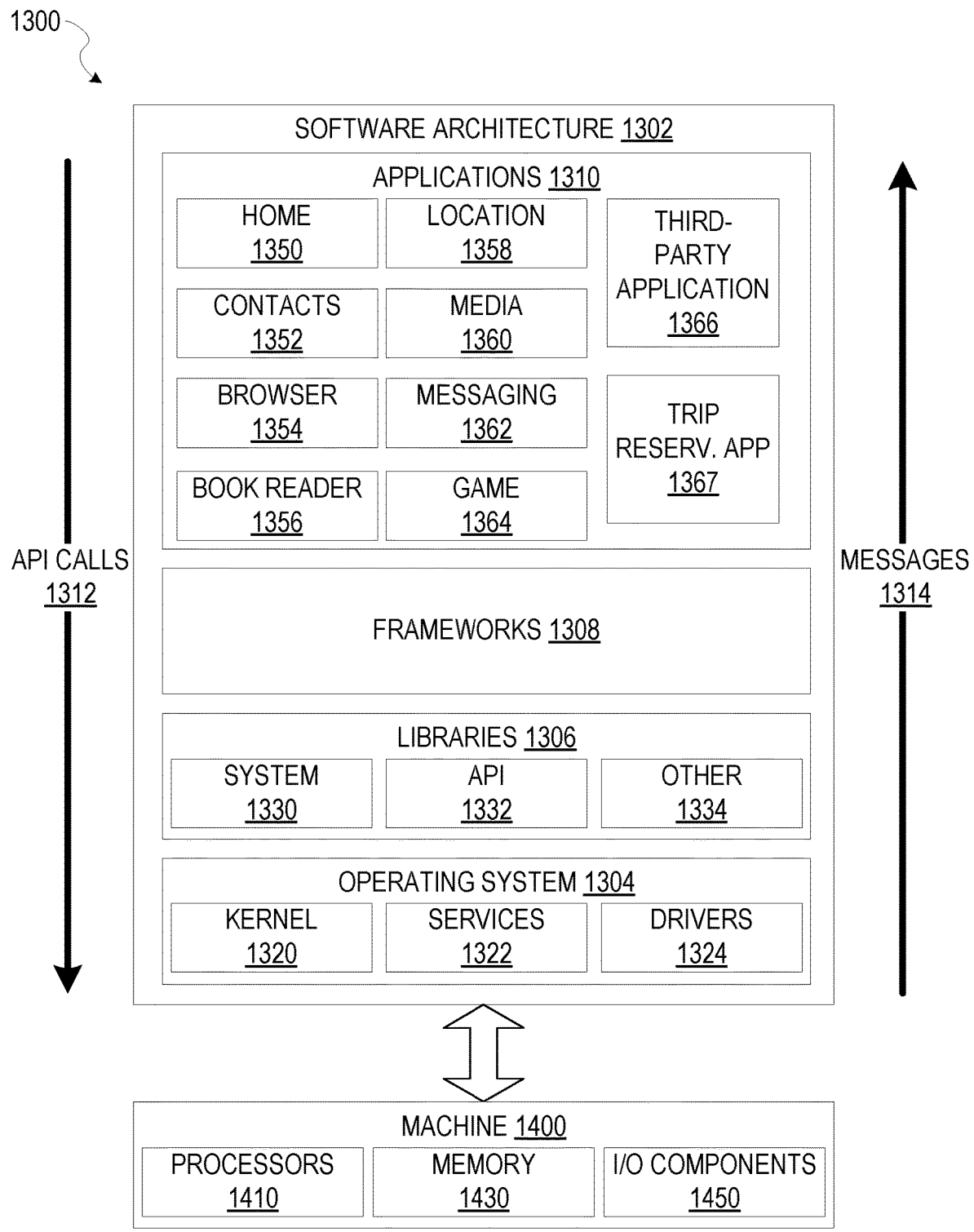
FIG. 13 is a block diagram illustrating an example of a software architecture that may be installed on a machine, according to some example embodiments.

FIG. 1300 is a block diagram 1300 illustrating a software architecture 1302, which can be installed on any one or more of the devices described above. For example, in various embodiments, the client device 110 and server systems 130, 102, 120, 122, and 124 may be implemented using some or all of the elements of the software architecture 1302. FIG. 13 is merely a non-limiting example of a software architecture, and it will be appreciated that many other architectures can be implemented to facilitate the functionality described herein. In various embodiments, the software architecture 1302 is implemented by hardware such as a machine 1400 of FIG. 14 that includes processors 1410, memory 1430, and input/output (I/O) components 1450. In this example, the software architecture 1302 can be conceptualized as a stack of layers where each layer may provide a particular functionality. For example, the software architecture 1302 includes layers such as an operating system 1304, libraries 1306, frameworks 1308, and applications 1310. Operationally, the applications 1310 invoke application programming interface (API) calls 1312 through the software stack and receive messages 1314 in response to the API calls 1312, consistent with some embodiments.

In various implementations, the operating system 1304 manages hardware resources and provides common services. The operating system 1304 includes, for example, a kernel 1320, services 1322, and drivers 1324. The kernel 1320 acts as an abstraction layer between the hardware and the other software layers, consistent with some embodiments. For example, the kernel 1320 provides memory management, processor management (e.g., scheduling), component management, networking, and security settings, among other functionality. The services 1322 can provide other common services for the other software layers. The drivers 1324 are responsible for controlling or interfacing with the underlying hardware, according to some embodiments. For instance, the drivers 1324 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1306 provide a low-level common infrastructure utilized by the applications 1310. The libraries 1306 can include system libraries 1330 (e.g., C standard library) that can provide functions such as memory allocation functions, string manipulation functions, mathematic functions, and the like. In addition, the libraries 1306 can include API libraries 1332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render graphic content in two dimensions (2D) and in three dimensions (3D) on a display), database libraries (e.g., SQLite to provide various relational database functions), web libraries (e.g., WebKit to provide web browsing functionality), and the like. The libraries 1306 can also include a wide variety of other libraries 1334 to provide many other APIs to the applications 1310.

The frameworks 1308 provide a high-level common infrastructure that can be utilized by the applications 1310, according to some embodiments. For example, the frameworks 1308 provide various graphic user interface (GUI) functions, high-level resource management, high-level location services, and so forth. The frameworks 1308 can provide a broad spectrum of other APIs that can be utilized by the applications 1310, some of which may be specific to a particular operating system 1304 or platform.

In an example embodiment, the applications 1310 include a home application 1350, a contacts application 1352, a browser application 1354, a book reader application 1356, a location application 1358, a media application 1360, a messaging application 1362, a game application 1364, and a broad assortment of other applications, such as a third-party application 1366. According to some embodiments, the applications 1310 are programs that execute functions defined in the programs. Various programming languages can be employed to create one or more of the applications 1310, structured in a variety of manners, such as object-oriented programming languages (e.g., Objective-C, Java, or C++) or procedural programming languages (e.g., C or assembly language). In a specific example, the third-party application 1366 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1366 can invoke the API calls 1312 provided by the operating system 1304 to facilitate functionality described herein.

Some embodiments may particularly include a trip reservation application 1367, which may be any application that requests data or other tasks to be performed by systems and servers described herein, such as the server system 102, third-party servers 130, and so forth. In certain embodiments, this may be a standalone application that operates to manage communications with a server system such as the third-party servers 130 or server system 102. In other embodiments, this functionality may be integrated with another application. The trip reservation application 1367 may request and display various data related to an online marketplace and may provide the capability for a user 106 to input data related to the system via voice, a touch interface, or a keyboard, or using a camera device of the machine 800, communication with a server system via the I/O components 850, and receipt and storage of object data in the memory 830. Presentation of information and user inputs associated with the information may be managed by the trip reservation application 1367 using different frameworks 1308, library 1306 elements, or operating system 1304 elements operating on a machine 800.

Figure 14:
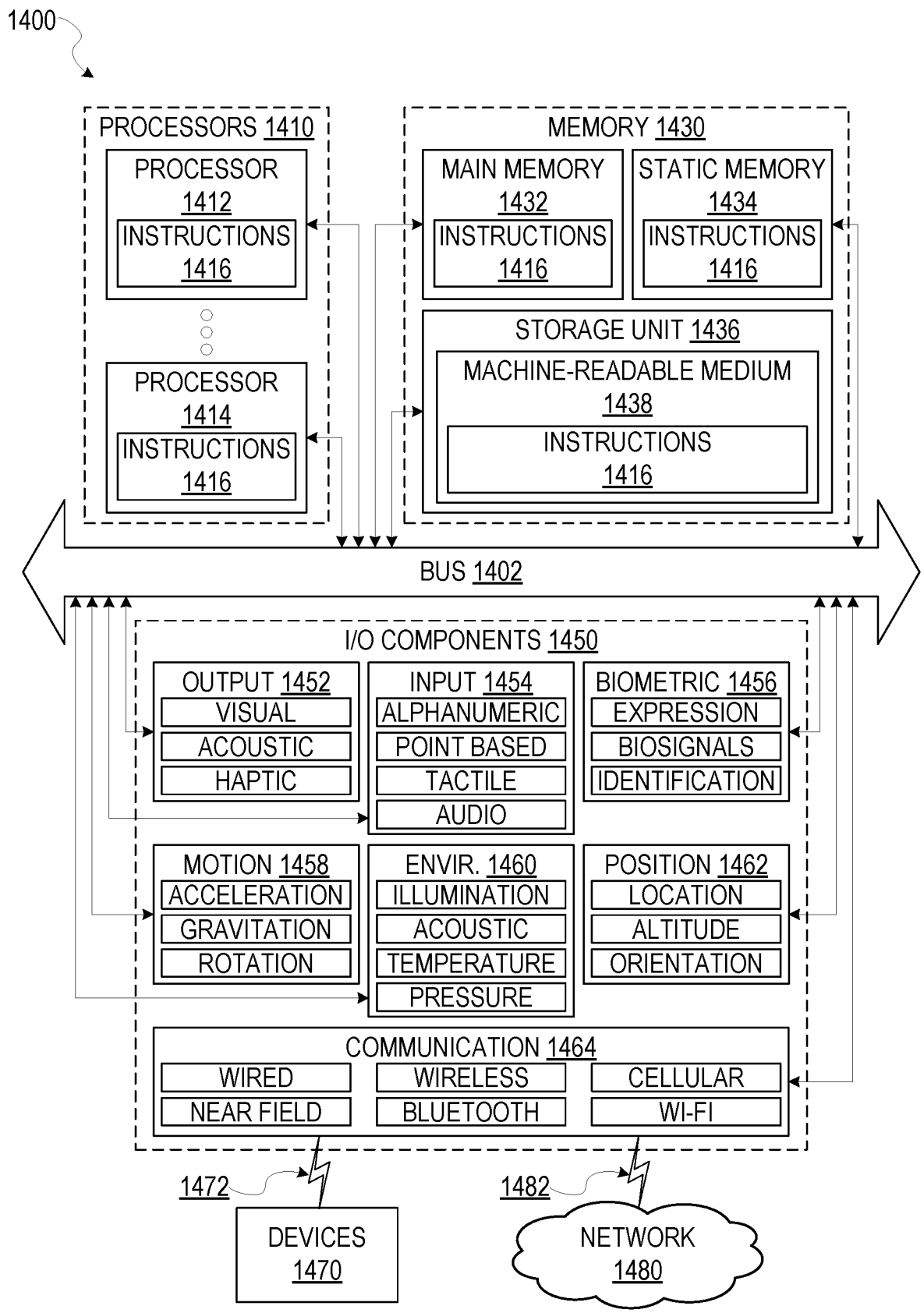
FIG. 14 illustrates a diagrammatic representation of a machine, in the form of a computer system, within which a set of instructions may be executed for causing the machine to perform any one or more of the methodologies discussed herein, according to an example embodiment.

FIG. 1400 is a block diagram illustrating components of a machine 1400, according to some embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1416 (e.g., software, a program, an application 1310, an applet, an app, or other executable code) for causing the machine 1400 to perform any one or more of the methodologies discussed herein can be executed. In alternative embodiments, the machine 1400 operates as a standalone device or can be coupled (e.g., networked) to other machines. In a networked deployment, the machine 1400 may operate in the capacity of a server machine 130, 102, 120, 122, 124, and the like, or a client device 110 in a server-client network environment, or as a peer machine in a peer-to-peer (or distributed) network environment. The machine 1400 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

In various embodiments, the machine 1400 comprises processors 1410, memory 1430, and I/O components 1450, which can be configured to communicate with each other via a bus 1402. In an example embodiment, the processors 1410 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) include, for example, a processor 1412 and a processor 1414 that may execute the instructions 1416. The term "processor" is intended to include multi-core processors 1410 that may comprise two or more independent processors 1412, 1414 (also referred to as "cores") that can execute instructions 1416 contemporaneously. Although FIG. 14 shows multiple processors 1410, the machine 1400 may include a single processor 1410 with a single core, a single processor 1410 with multiple cores (e.g., a multi-core processor 1410), multiple processors 1412, 1414 with a single core, multiple processors 1412, 1414 with multiple cores, or any combination thereof.

The memory 1430 comprises a main memory 1432, a static memory 1434, and a storage unit 1436 accessible to the processors 1410 via the bus 1402, according to some embodiments. The storage unit 1436 can include a machine-readable medium 1438 on which are stored the instructions 1416 embodying any one or more of the methodologies or functions described herein. The instructions 1416 can also reside, completely or at least partially, within the main memory 1432, within the static memory 1434, within at least one of the processors 1410 (e.g., within the processor's cache memory), or any suitable combination thereof, during execution thereof by the machine 1400. Accordingly, in various embodiments, the main memory 1432, the static memory 1434, and the processors 1410 are considered machine-readable media 1438.

As used herein, the term "memory" refers to a machine-readable medium 1438 able to store data temporarily or permanently and may be taken to include, but not be limited to, random-access memory (RAM), read-only memory (ROM), buffer memory, flash memory, and cache memory. While the machine-readable medium 1438 is shown, in an example embodiment, to be a single medium, the term "machine-readable medium" should be taken to include a single medium or multiple media (e.g., a centralized or distributed database, or associated caches and servers) able to store the instructions 1416. The term "machine-readable medium" shall also be taken to include any medium, or combination of multiple media, that is capable of storing instructions (e.g., instructions 1416) for execution by a machine (e.g., machine 1400), such that the instructions 1416, when executed by one or more processors of the machine 1400 (e.g., processors 1410), cause the machine 1400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1450 include a wide variety of components to receive input, provide output, produce output, transmit information, exchange information, capture measurements, and so on. In general, it will be appreciated that the I/O components 1450 can include many other components that are not shown in FIG. 14. The I/O components 1450 are grouped according to functionality merely for simplifying the following discussion, and the grouping is in no way limiting. In various example embodiments, the I/O components 1450 include output components 1452 and input components 1454. The output components 1452 include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1454 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1450 include biometric components 1456, motion components 1458, environmental components 1460, or position components 1462, among a wide array of other components. For example, the biometric components 1456 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1458 include acceleration sensor components (e.g., accelerometer), gravitation sensor components, rotation sensor components (e.g., gyroscope), and so forth. The environmental components 1460 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1462 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 include a network interface component or another suitable device to interface with the network 1480. In further examples, communication components 1464 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1470 may be another machine 1400 or any of a wide variety of peripheral devices (e.g., a peripheral device coupled via a Universal Serial Bus (USB)).

Moreover, in some embodiments, the communication components 1464 detect identifiers or include components operable to detect identifiers. For example, the communication components 1464 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1464, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1480 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1480 or a portion of the network 1480 may include a wireless or cellular network, and the coupling 1482 may be a Code Division Multiple Access (CDMA) connection, a Global System for Mobile communications (GSM) connection, or another type of cellular or wireless coupling. In this example, the coupling 1482 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

In example embodiments, the instructions 1416 are transmitted or received over the network 1480 using a transmission medium via a network interface device (e.g., a network interface component included in the communication components 1464) and utilizing any one of a number of well-known transfer protocols (e.g., Hypertext Transfer Protocol (HTTP)). Similarly, in other example embodiments, the instructions 1416 are transmitted or received using a transmission medium via the coupling 1472 (e.g., a peer-to-peer coupling) to the devices 1470. The term "transmission medium" shall be taken to include any intangible medium that is capable of storing, encoding, or carrying the instructions 1416 for execution by the machine 1400, and includes digital or analog communications signals or other intangible media to facilitate communication of such software.

Furthermore, the machine-readable medium 1438 is non-transitory (in other words, not having any transitory signals) in that it does not embody a propagating signal. However, labeling the machine-readable medium 1438 "non-transitory" should not be construed to mean that the medium is incapable of movement; the machine-readable medium 1438 should be considered as being transportable from one physical location to another. Additionally, since the machine-readable medium 1438 is tangible, the machine-readable medium 1438 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising:
   receiving, by a computing system, a plurality of price changes for a first listing in an online marketplace;
   inputting training data into a first machine learning model to generate a first trained machine learning model, the first machine learning model comprising a plurality of hard layers for learning correlations between listing features and a plurality of soft layers, each soft layer for learning correlations for a prespecified listing feature;
   analyzing, by the computing system using the first trained machine learning model for predicting how a change in listing price effects a plurality of listing features, both price independent listing features and each of the plurality of price changes for the first listing to determine a predicted value for each of a prespecified price dependent listing feature for each of the plurality of price changes for the first listing;
   generating, by the computing system using the first trained machine learning model, the predicted value for each of the prespecified price dependent listing features for each of the plurality of price changes for the first listing, at least one of the prespecified price dependent listing features comprising an attribute of the first listing that is displayed on a client device of a user; and
   inputting, by the computing system, each of the plurality of price changes and associated predicted values for each prespecified price dependent listing feature as training data into a second machine learning model to generate a second trained machine learning model to predict a probability that a listing will be booked for a given date.

2. The method of claim 1, wherein before receiving the plurality of price changes for a first listing in an online marketplace the method comprises:
   generating, by the computing system, the training data for the first machine learning model to predict how a change in listing price effects a plurality of listing features by:
      analyzing data generated in an online market place to determine a plurality of listings that have only a single price change in a predetermined time period;
      generating listing features for each of the plurality of listings that have only a single price change in the predetermined time period; and
      storing as the training data the generated listing features for each of the plural of listings that have only a single price change in the predetermined time period.

3. The method of claim 2, wherein analyzing the data generated in the online marketplace to determine listings that have only a single price change in the predetermined time period further comprises analyzing the data generated to determine that the single price change occurred at least a predetermined amount of time after a start date of the time period.

4. The method of claim 1, further comprising:
   generating data for a demand curve for the first listing using a current listing price and each of the plurality of price changes and associated predicted values for each prespecified price dependent listing feature, the demand curve to illustrate the probability that the first listing will be booked for a given date for a plurality of price values; and
   generating the demand curve from generated data.

5. The method of claim 1, further comprising:
   generating listing features for a plurality of listings that have only a single price change in a predetermined time period; and
   storing as the training data, the generated listing features for the plural of listings that have only the single price change in the predetermined time period.

6. The method of claim 1, wherein the training data is generated based on a plurality of listings that have only a single price change in a predetermined time period, wherein price dependent listing features comprise at least one of number of listing views, price discount, percentage of time a listing is occupied, a number of users that looked at a listing within a certain time period, a number of times users see a listing in a first results page for listings, click-through rates for active listings in the first results page, extra charges, and the percentage of time a listing is occupied of available dates for the listing.

7. A server computer comprising:
a memory that stores instructions; and
one or more processors configured by the instructions to perform operations comprising:
receiving, by a computing system, a plurality of price changes for a first listing in an online marketplace;
inputting training data into a first machine learning model to generate a first trained machine learning model, the first machine learning model comprising a plurality of hard layers for learning correlations between listing features and a plurality of soft layers, each soft layer for learning correlations for a prespecified listing feature;
analyzing, using the first trained machine learning model for predicting how a change in listing price effects a plurality of listing features, both price independent listing features and each of the plurality of price changes for the first listing to determine a predicted value for each of a prespecified price dependent listing feature for each of the plurality of price changes for the first listing;
generating, using the first trained machine learning model, the predicted value for each of the prespecified price dependent listing features for each of the plurality of price changes for the first listing, at least one of the prespecified price dependent listing features comprising an attribute of the first listing that is displayed on a client device of a user; and
inputting each of the plurality of price changes and associated predicted values for each prespecified price dependent listing feature as training data into a second machine learning model to generate a second trained machine learning model to predict a probability that a listing will be booked for a given date.

8. The server of claim 7, wherein the training data is generated based on a plurality of listings that have only a single price change in a predetermined time period, wherein price dependent listing features comprise at least one of number of listing views, price discount, percentage of time a listing is occupied, a number of users that looked at a listing within a certain time period, a number of times users see a listing in a first results page for listings, click-through rates for active listings in the first results page, extra charges, and the percentage of time a listing is occupied of available dates for the listing.

9. The server of claim 7, wherein before receiving the plurality of price changes for a first listing in an online marketplace the operations comprise:
generating the training data for the first machine learning model to predict how a change in listing price effects a plurality of listing features by:
analyzing data generated in an online market place to determine a plurality of listings that have only a single price change in a predetermined time period;
generating listing features for each of the plurality of listings that have only a single price change in the predetermined time period; and
storing as the training data the generated listing features for each of the plural of listings that have only a single price change in the predetermined time period.

10. The server of claim 9, wherein analyzing the data generated in the online marketplace to determine listings that have only a single price change in the predetermined time period further comprises analyzing the data generated to determine that the single price change occurred at least a predetermined amount of time after a start date of the time period.

11. The server computer of claim 7, the instructions further comprising:
generating data for a demand curve for the first listing using a current listing price and each of the plurality of price changes and associated predicted values for each prespecified price dependent listing feature, the demand curve to illustrate the probability that the first listing will be booked for a given date for a plurality of price values; and
generating the demand curve from generated data.

12. The server computer of claim 11, the instructions further comprising:
generating a recommended price for a listing based on an optimal price indicated in the generated demand curve.

13. The server computer of claim 7, the instructions further comprising:
analyzing, using the second trained machine learning model, a listing price for the first listing, listing features for the first listing, and each of the plurality of price changes and associated predicted values for each prespecified price dependent listing feature; and
generating, using the second trained machine learning model, a probability that the first listing will be booked for the given date.

14. The server computer of claim 7, wherein price dependent listing features comprise at least one of number of listing views, price discount, percentage of time a listing is occupied, a number of users that looked at a listing within a certain time period, a number of times users see a listing in a first results page for listings, click-through rates for active listings in the first results page, extra charges, and the percentage of time a listing in occupied of available dates for the listing.

15. A non-transitory computer-readable medium comprising instructions stored thereon that are executable by at least one processor to cause a computing device associated with a first data owner to perform operations comprising:
receiving, by a computing system, a plurality of price changes for a first listing in an online marketplace;
inputting training data into a first machine learning model to generate a first trained machine learning model, the first machine learning model comprising a plurality of hard layers for learning correlations between listing features and a plurality of soft layers, each soft layer for learning correlations for a prespecified listing feature;
analyzing, using the first trained machine learning model for predicting how a change in listing price effects a plurality of listing features, both price independent listing features and each of the plurality of price changes for the first listing to determine a predicted value for each of a prespecified price dependent listing feature for each of the plurality of price changes for the first listing;
generating, using the first trained machine learning model, the predicted value for each of the prespecified price dependent listing features for each of the plurality of price changes for the first listing, at least one of the prespecified price dependent listing features comprising an attribute of the first listing that is displayed on a client device of a user; and
inputting each of the plurality of price changes and associated predicted values for each prespecified price dependent listing feature as training data into a second machine learning model to generate a second trained machine learning model to predict a probability that a listing will be booked for a given date.

16. The non-transitory computer-readable medium of claim 15, wherein before receiving the plurality of price changes for a first listing in an online marketplace the operations comprise:

generating the training data for the first machine learning model to predict how a change in listing price effects a plurality of listing features by:

analyzing data generated in an online market place to determine a plurality of listings that have only a single price change in a predetermined time period;

generating listing features for each of the plurality of listings that have only a single price change in the predetermined time period; and storing as training data the generated listing features for each of the plural of listings that have only a single price change in the predetermined time period.

17. The non-transitory computer-readable medium of claim 16, wherein analyzing the data generated in the online marketplace to determine listings that have only a single price change in the predetermined time period further comprises analyzing the data generated to determine that the single price change occurred at least a predetermined amount of time after a start date of the time period.

18. The non-transitory computer-readable medium of claim 15, the instructions further comprising:

generating data for a demand curve for the first listing using a current listing price and each of the plurality of price changes and associated predicted values for each prespecified price dependent listing feature, the demand curve to illustrate the probability that the first listing will be booked for a given date for a plurality of price values;

generating the demand curve from generated data; and generating a recommended price for a listing based on an optimal price indicated in the generated demand curve.

19. The non-transitory computer-readable medium of claim 15, the instructions further comprising:

analyzing, using the second trained machine learning model, a listing price for the first listing, listing features for the first listing, and each of the plurality of price changes and associated predicted values for each prespecified price dependent listing feature; and generating, using the second trained machine learning model, a probability that the first listing will be booked for the given date.

20. The non-transitory computer-readable medium of claim 15, wherein price dependent listing features comprise at least one of number of listing views, price discount, percentage of time a listing is occupied, a number of users that looked at a listing within a certain time period, a number of times users see a listing in a first results page for listings, click-through rates for active listings in the first results page, extra charges, and the percentage of time a listing in occupied of available dates for the listing.

\* \* \* \* \*